United States Patent
Mukherjee et al.

(10) Patent No.: US 7,426,195 B2
(45) Date of Patent: Sep. 16, 2008

(54) METHOD AND APPARATUS FOR PROVIDING USER IDENTITY BASED ROUTING IN A WIRELESS COMMUNICATIONS ENVIRONMENT

(75) Inventors: Sarit Mukherjee, Morganville, NJ (US); Sanjoy Paul, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1109 days.

(21) Appl. No.: 10/279,310

(22) Filed: Oct. 24, 2002

(65) Prior Publication Data

US 2004/0081118 A1 Apr. 29, 2004

(51) Int. Cl.
*H04Q 7/00* (2006.01)

(52) U.S. Cl. .......................... 370/328; 370/349

(58) Field of Classification Search ......... 370/352–358, 370/310.2, 328, 338, 349, 389, 400–402, 370/392, 373, 384, 395.52, 310, 329, 341
See application file for complete search history.

(56) References Cited

U.S. PATENT DOCUMENTS

| | | | |
|---|---|---|---|
| 6,745,012 B1 * | 6/2004 | Ton et al. ................. | 455/67.13 |
| 6,834,050 B1 * | 12/2004 | Madour et al. ............. | 370/392 |
| 6,876,640 B1 * | 4/2005 | Bertrand et al. ........... | 370/331 |
| 6,987,764 B2 * | 1/2006 | Hsu .......................... | 370/390 |
| 7,043,253 B2 * | 5/2006 | Madour et al. ............. | 455/453 |
| 7,116,668 B2 * | 10/2006 | Sivalingham ............... | 370/394 |
| 2002/0021681 A1 * | 2/2002 | Madour ...................... | 370/331 |
| 2002/0057662 A1 * | 5/2002 | Lim ........................... | 370/338 |
| 2002/0068565 A1 * | 6/2002 | Purnadi et al. ............. | 455/436 |
| 2002/0083203 A1 * | 6/2002 | Lim ........................... | 709/246 |
| 2002/0186696 A1 * | 12/2002 | Lim ........................... | 370/395.52 |
| 2003/0053465 A1 * | 3/2003 | Sivalingham et al. ....... | 370/401 |

* cited by examiner

*Primary Examiner*—Brenda Pham

(57) ABSTRACT

A method and apparatus for providing user orientated wireless data services over a wireless communications network to a plurality of mobile nodes. The wireless communications network includes a plurality of packet data servicing nodes (PDSN's), a plurality of packet control functions (PCFs), and a PCF-PDSN routing controller (PPRC). The PPRC acts as a single PDSN, as well as a surrogate PCF from the perspective of the PDSNs in the private IP network of the service provider. The PPRC serves to provide user oriented wireless services, as opposed to device orientated services. The method includes receiving a data session request from a mobile node, and initiating a point-to-point connection between a PCF receiving the data session request and a PPRC. The PPRC selects one of the PDSNs, and initiates a point-to-point connection between the PPRC and the selected PDSN. The PPRC splices a point-to-point connection between the receiving PCF and the selected PDSN, and commences a point-to-point data session between the mobile node and the PDSN, wherein IP packets are routed over a public IP network.

23 Claims, 13 Drawing Sheets

US 7,426,195 B2

METHOD AND APPARATUS FOR PROVIDING USER IDENTITY BASED ROUTING IN A WIRELESS COMMUNICATIONS ENVIRONMENT

FIELD OF INVENTION

The present invention relates to wireless networks. More specifically, the present invention relates to wireless data service architecture.

DESCRIPTION OF THE BACKGROUND ART

Under current CDMA2000 architecture, a mobile station (MS) may exchange packetized information to devices (e.g., desktop computers, laptops, and the like) coupled to a public IP network, such as the Internet. In particular, a mobile station (e.g., cellular phone, PDA, laptop, and the like) sends a wireless communication to a base station (BS) where the information is received by a radio network controller (RNC), down-converted, and packetized by a packet control function (PCF) entity at the RNC.

The service provider (SP) may utilize a private IP network having multiple packet data serving nodes (PDSN), which route the packetized data to the public IP network. The PCF sends the data to a PDSN using a generic routing encapsulation (GRE) tunnel, where a point-to-point protocol (PPP) connection is terminated at the PDSN.

One problem with the current CMDA2000 architecture is that the CDMA2000 architecture makes data services device orientated, rather than user orientated. In particular, one responsibility of the PCF is to compute which PDSN is used to send the MS's connection, i.e., to form a GRE tunnel. Each PCF maintains a configuration table of all the current PDSN's available in the service provider's (SPs) private network, and then determines a particular PDSN to use. In the PDSN configuration table the PDSNs are locally numbered from 0 to N−1 in ascending order of PDSN 11) addresses, where N is the total number of entries in the table. For initial PDSN assignment and reselection, the PCF determines which PDSN to use for a particular mobile station by a PDSN selection algorithim: PDSN No.=(truncated MS IMSI) modulo N, where the MS IMSI is a unique number for each mobile station. That is, the PDSN No.=(truncated MS IMSI) modulo N. For example, if a MS having an IMSI value of 7053 is in communication with a PCF, and there are eight PDSN's in the SP's private network (N=8), then 7053 modulo 8=5. It is noted that the PCF uses the remainder (5) as an index or correlation value pertaining to one of the N PDSNs. In the example above where the PDSNs are numbered between zero (0) and N−1, the sixth PDSN (PDSN No.=5) is utilized by the PCF to terminate an IP tunnel therebetween.

As such, it is important that the configuration tables of all the PCFs match, since disparities may result in the selection of the wrong PDSN, which may result in loss of particular services provided by a particular PDSN or session termination due to PCF handoff. Moreover, the PCF has no knowledge of the capabilities of the PDSNs, or the service requirements of the mobile user when the PCF selects a PDSN. As such, a PCF may connect to a PDSN having limited service capabilities.

Various PDSN's provide different services, such as virtual private networks (VPN), prepaid services, and the like. As such, a subscriber of data services may only utilize such services by connecting to a PDSN capable of such services. For example, a subscriber who has VPN services may not be able to utilize the VPN services if such subscriber uses a mobile station (e.g., PDA) of a third party. That is, that third party may not subscribe to the same type or level of services from the service provider. As such, the third party's particular PDA may not have authorization to connect to a PDSN having VPN services. Therefore, the subscriber is limited to services from their own particular mobile station.

A third problem with the current architecture includes a lack of load balancing among the multiple PDSNs. That is, the data service provider cannot guarantee that the sessions are distributed evenly, which may result in bandwidth shortages, and loss of connectivity.

A fourth problem occurs when a PDSN fails, and all data session anchored to the failed PDSN terminate. The only possible recovery is to reinitiate the data sessions from the MS's and then redirect them to a working PDSN. However, by doing so, all mobile users' current data sessions that are being handled by the PDSN will terminate. In addition, the simple IP address of the MS may change. Moreover, if a PCF can reach only one PDSN, no recovery is possible in instances where that one PDSN fails.

Another problem occurs during roaming by the MS between two PCF's. In particular, a data session built on simple IP terminates when the PCFs are disjoint at the PDSN level; the PCFs are not disjoint, but one or more PCFs have incorrectly configured PDSN table entries; or if the PDSN is at full load capacity and cannot accept a new connection. Therefore, there is a need to provide improved data services for mobile station subscribers.

SUMMARY OF THE INVENTION

The disadvantages heretofore associated with the prior art, are overcome by the present invention of a method and apparatus for providing user orientated wireless data services over a wireless communications network to a plurality of mobile nodes. The wireless communications network includes a plurality of packet data servicing nodes (PDSN's), a plurality of packet control functions (PCFs), and a PCF-PDSN routing controller (PPRC). The PPRC acts as a single PDSN, as well as a surrogate PCF from the perspective of the PDSNs in the private IP network of the service provider. The PPRC serves to provide user oriented wireless services, as opposed to device orientated services.

The method includes receiving a data session request from a mobile node, and initiating a point-to-point connection between a PCF receiving the data session request and a PPRC. The PPRC selects one of the PDSNs, and initiates a point-to-point connection between the PPRC and the selected PDSN. The PPRC splices a point-to-point connection between the receiving PCF and the selected PDSN, and commences a point-to-point data session between the mobile node and the PDSN, wherein IP packets are routed over a public IP network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a routing device for routing packetized information in a wireless environment from multiple packet control function (PCF) entities to a plurality of packet data serving nodes (PDSN). In particular, the present wireless infrastructure is augmented with an inventive PCF-PDSN routing controller (PPRC), whereby from the perspective of the PCFs, the PPRC acts as a single PDSN in the private IP network of the service provider. The PPRC also acts as a surrogate PCF from the perspective of the PDSNs in the private IP network of the service provider. As discussed below with regard to FIGS. 1-12, the PPRC serves to provide user oriented wireless services, as opposed to device orientated services. The PPRC is also capable of providing load balancing amongst the PDSNs in the wireless network, as well as other inventive features as is discussed below.

Figure 1:
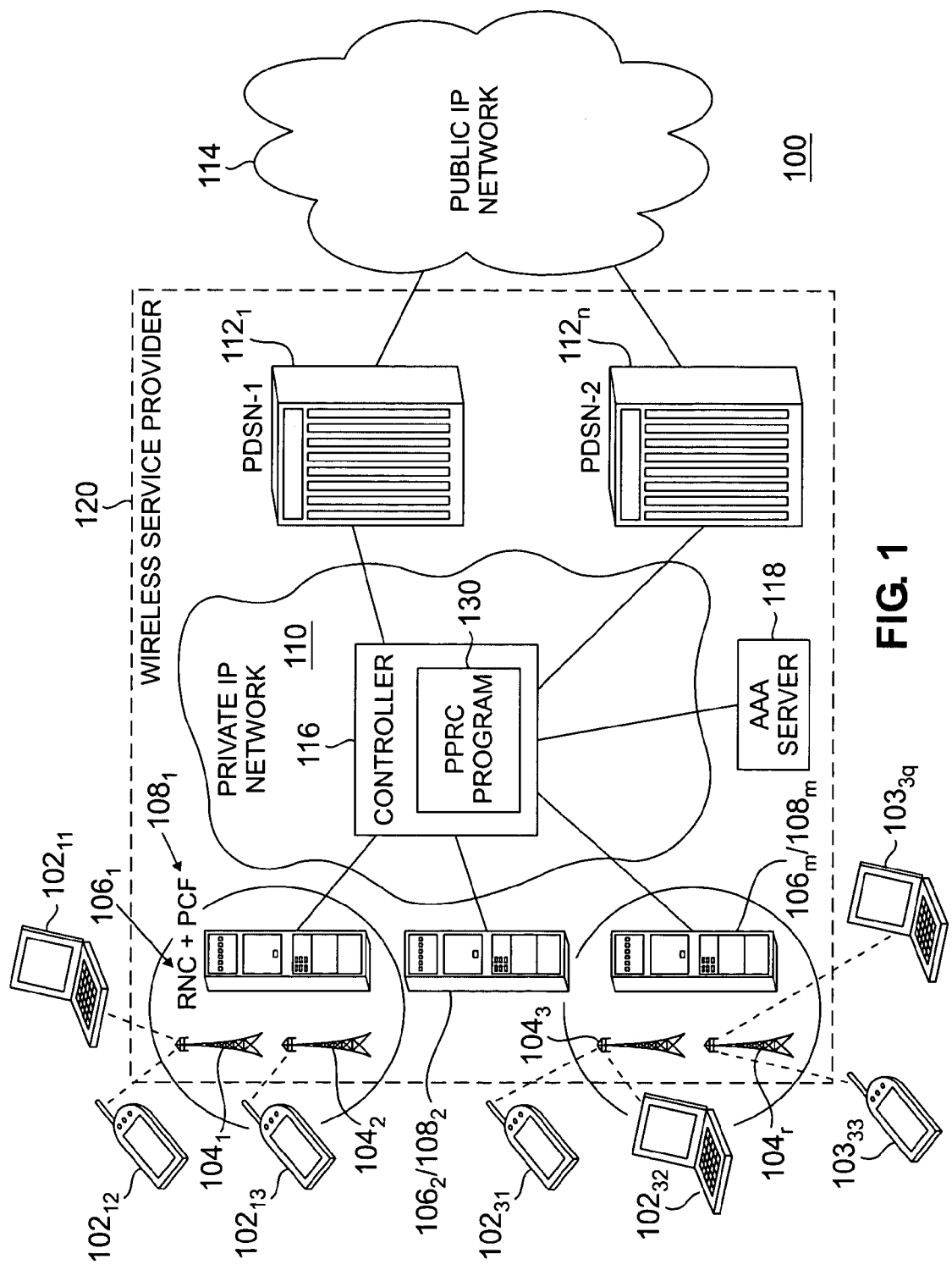
FIG. 1 depicts an exemplary wireless communications network environment in which the present invention may be employed.

FIG. 1 depicts an exemplary communications wireless network environment 100 in which the present invention may be employed. The exemplary wireless communications network environment 100 comprises a plurality of mobile stations 102, a wireless communications service provider (SP) 120, and at least one public IP network 114.

The wireless service provider 120 is any service provider having access to resources operating under the CMDA2000 standard. Thus, the services provided by the SP 120 conform to the International Mobile Telecommunications (IMT)-2000 standards and 3GPP2 standards, which are hereby incorporated by reference in their entireties.

The service provider 120 includes a plurality of cell towers $104_r$ (where r is an integer greater than 1), a plurality of radio network controllers (RNC) $106_m$, a plurality of packet control function (PCF) $108_m$ (where m is an integer greater than 1), a plurality of packet data serving nodes (PDSN) $112_n$ (where n is an integer greater than one), at least one PCF-PDSN routing controller (PPRC) 116, and an AAA (authentication, authorization, accounting) server 118. The cell towers 104 are coupled to a base station (not shown), which facilitates the RNC 106, PCF 108, among other equipment (not shown). The base station is an element in the public radio telecommunications system used for radio telecommunications with mobile stations 102.

In one embodiment (as shown in FIG. 1), the RNC 106 and PCF 108 functionalities are illustratively facilitated in a single device. In a second embodiment, the RNC 106 and PCF 108 may be facilitated by separate components that interface with each other. The RNC (i.e., base station controller) 106 provides the control functionality of the base station that includes call control logic and interconnections to a mobile switching center (MSC, not shown), other base station controllers 106, and base transceiver stations of neighboring base stations for purposes of soft/softer handoff.

The PCF 108 is a component in the wireless communications network 100 that manages the relay of packets between the RNC and the PDSN 112. The PDSNs 112 route MS originated or MS terminated packet data traffic. A PDSN establishes, maintains, and terminates link layer sessions to mobile stations 102. The PDSNs 112 illustratively communicate with the PCFs 108, via a PPRC function (e.g., PPRC program 130) residing in the controller 116, as discussed below in further detail. The PDSNs 112 route data packets to other devices over a public IP network 114, such as the Internet.

The mobile stations (MS) 102 may be any mobile wireless device capable of wireless transmission and reception, such as a laptop computer, PDA, and the like. The MS 102 use point-to-point protocol (PPP) as the data link protocol. Each MS 102 communicates with the base station associated in the cell that the MS 102 is located via the cell towers 104. As such, the mobile stations 102, cell towers 104 and RNC 106 form part of a radio access network, while the PCF 108, PPRC 116, and PDSNs 112 form a data service network in the wireless communications network 100. Each MS 102 is associated with a unique International Mobile Subscriber Identity (IMSI).

It is noted that although the IMSI number is discussed as being associated with a single mobile station, a single mobile station may provide multiple network connectivity, and thereby serve as a multiple node mobile device. As such, one skilled in the art will appreciate that each mobile node has an associated IMSI value. For purposes of better understanding the invention, the terms mobile node and mobile station may be considered synonymous and are used interchangeably.

In operation, a subscriber of the service provider 102 desiring to transfer or receive data over the public IP network 114 establishes a communication link with the RNC (i.e., base station controller (BSC) 106, as is well known in the art. Specifically, a signaling interface (i.e., A9 interface—not shown) between the RNC 106 and PCF 108 is used to carry signaling information therebetween. Further, a user traffic interface (i.e., A8 interface—not shown) between the RNC 106 and PCF 108 is used to carry user traffic therebetween.

Figure 2:
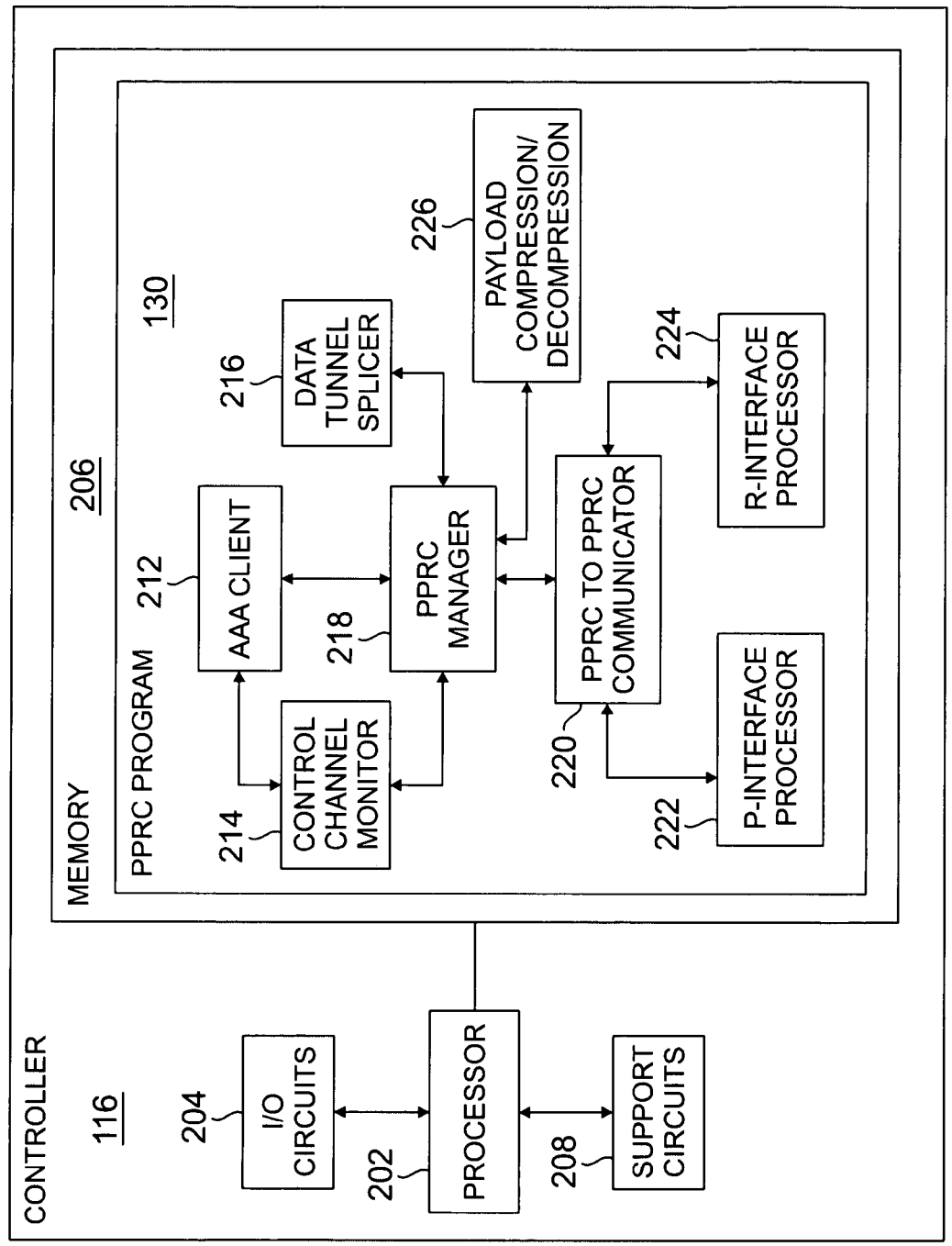
FIG. 2 depicts a high-level block diagram of a controller suitable for use in the communications network of FIG. 1.

FIG. 2 depicts a high-level block diagram of a controller 116 suitable for use in the communications network 100 of FIG. 1. Specifically, the controller 116 (e.g., implementing a PPRC program 130) of FIG. 2 comprises of a processor 202, as well as memory 206 for storing various control programs and the PPRC program 130. The memory 206 may be volatile memory (e.g., RAM) and/or non-volatile memory, such as one or more disk drives or programmable memory, such as an EEPROM, and the like. In FIG. 2, the PPRC program 130 is depicted as being stored in local memory 206 in the controller 116.

The processor 202 cooperates with conventional support circuitry 208 such as power supplies, clock circuits, cache memory and the like, as well as circuits that assist in executing the software routines stored in the memory 206. As such, it is contemplated that some of the process steps discussed herein as software processes may be implemented within hardware, for example as circuitry that cooperates with the processor 202 to perform various steps. The controller 116 also contains input/output (I/O) circuitry 204 that forms an interface between the various functional elements communicating with the controller 108. For example, in the embodiment of FIG. 1, the controller 116 communicates with the PCFs 108 and the PDSNs 112.

Although the controller 116 of FIGS. 1 and 2 is depicted as a general-purpose computer that is programmed to perform various control functions in accordance with the present invention, the invention may be implemented in hardware as, for example, an application specific integrated circuit (ASIC). As such, processing steps described herein are intended to be broadly interpreted as being equivalently performed by software, hardware, or a combination thereof.

In one embodiment, the PPRC program 130 comprises a plurality of software modules comprising an AAA client module 212, a control channel monitor 214, a data tunnel splicer 216, a PPRC manager 218, a PPRC-to-PPRC communicator 220, a P-interface processor 222, a R-interface processor 224, and a payload compression/decompression manager 226. The AAA client 212 collects authorization information from the user, as well as contacts the AAA server 118 for user authentication and services. The control monitor 214 monitors the PPP (point-to-point protocol) and mobile IP (MIP) control messages, as well as initiates/terminates PPP control messages for a session. The data tunnel splicer 216 splices a data session between a PCF-PDSN pair for a PPP session.

The P-interface and R-interface processors 222 and 224 respectively implement the P-interface and R-interface of A11 signaling, as discussed below in further detail. The PPRC-to-PPRC communicator 220 sends and receives control messages to other PPRC's 116 using the R- and P-interface processors 222 and 224. The PPRC manager 218 maintains PPRC configuration information, communicates with the other PPRC modules, and interprets messages from other modules and takes appropriate actions. The payload compression/decompression manager 226 provides payload compression and decompression features for data over the wireless links. Details of the software modules' functional aspects and interrelationships are discussed in further detail below with regard to FIGS. 3-12.

A person skilled in the art will recognize that any programming language and code may be used to implement the functional aspects of the plurality of software modules forming the PPRC program 130. Further, one skilled in the art will recognize that a single module or combination of modules may be used to implement the functional aspects of the PPRC program 130. For purposes of clarity, the PPRC controller and PPRC program 130 may also be described hereinafter as a "PPRC" 116.

The PPRC 116 acts as a "shim" between each PCF 108 and the PDSNs 112. The acronym PPRC and shim are hereby defined as being synonymous and are used interchangeably herein. In one embodiment, a single PPRC 116 may be utilized to serve as a switch between all of the PCFs 108 and the available PDSNs 112. In a second embodiment, multiple PPRCs 116 may be utilized in the private IP network 110 to serve as switches for different groups of PCFs 108 and PDSNs 112. In either embodiment, the PPRC 116 is connected between the PCFs 108 and PDSNs 112 via a private IP network 110 of the service provider 120.

In a third embodiment, individual PPRC 116 controller boards may be installed with each of the PCFs 108 and/or RNC 108 in a common housing. For example, the PCFs 108 and PPRC 116 may be respectively facilitated on individual circuit boards that are connected to the RNC 106 via a backplane. Alternatively, the PPRC 116 may be stored in memory as a software program on the PCFs 108. As such, the PPRC 116 may be developed as software, hardware, or a combination thereof. One skilled in the art will appreciate that the PCF 108 and shim 116 may communicate and interface by any other connecting techniques. Accordingly, since each RNC 106 is associated with a PCF 108, and each PCF 108 has an associated PPRC 116 associated with it, a clustering effect is provided. That is, any RNC 106 may connect to any PCF 108, while any PCF 108 may connect to any available PPRC 116, which selectively connects to a particular PDSN 112 in the private IP network 110 of the service provider 120.

Figure 3:
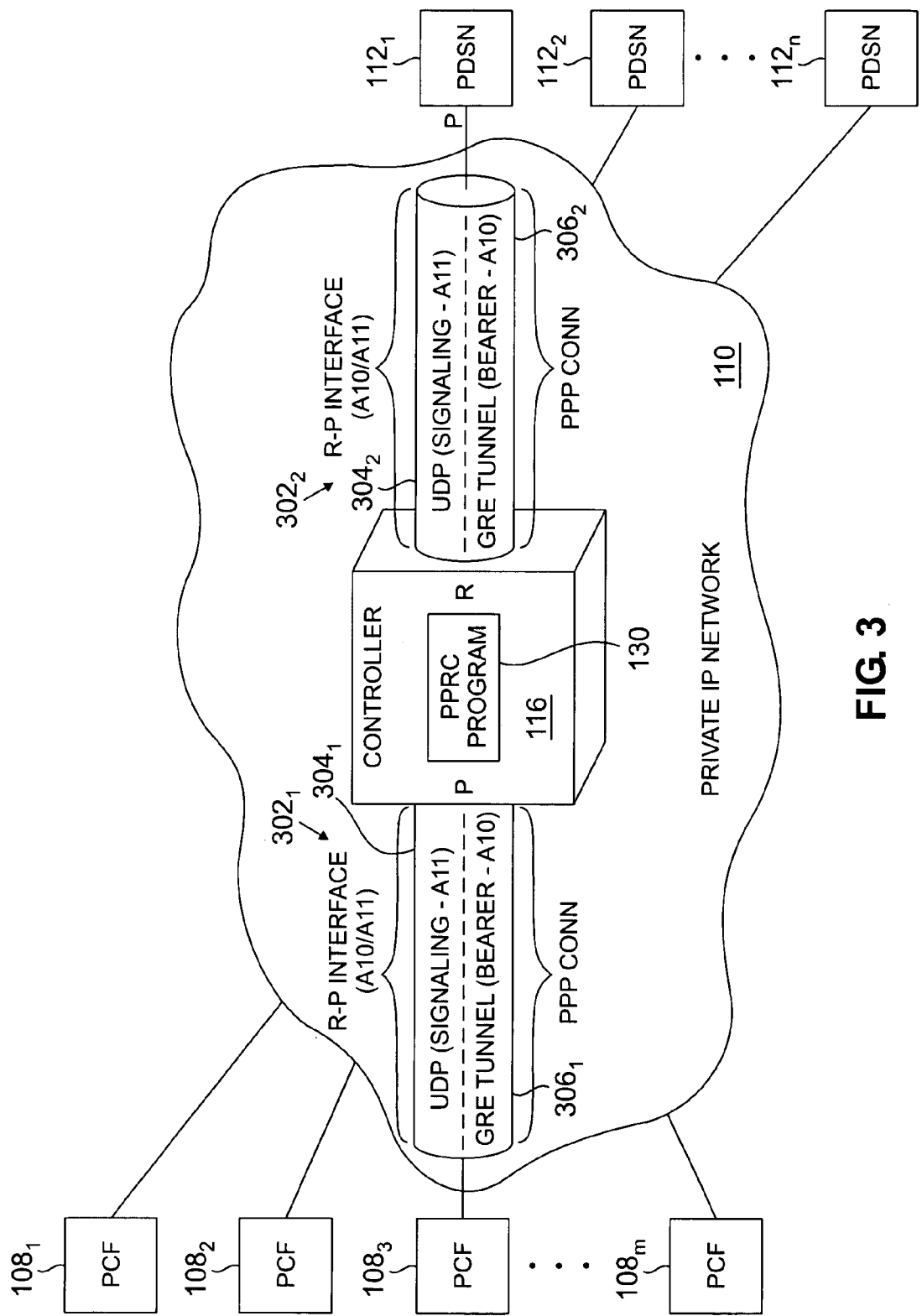
FIG. 3 depicts a schematic diagram of a data service network including a PCF-PDSN routing controller (PPRC) of the present invention.

FIG. 3 depicts a schematic diagram of a data service network 110 including a PCF-PDSN routing controller (PPRC) 116 of the present invention. More specifically, FIG. 3 illustratively depicts two R-P interfaces $302_1$ and $302_2$ (collectively R-P interface 302) that couple a PCF (e.g., PCF $108_3$) to the PPRC 116 and the PPRC 116 to a PDSN (e.g., $112_1$). An R-P interface 302 is the interface between the radio network (RN), i.e., the PCF 108, and the PDSN 112, which is also referred as the "$A_{quarter}$" interface or the "A10/A11" interface. In particular, the PPRC 116 acts as a P-interface with regard to the PCFs 108, and a R-interface with regard to the PDSNs 112.

A first R-P interface $302_1$ is first formed between the PCF $108_3$ and the P-interface processor 222 of the PPRC 116. The first R-P interface $302_1$ (i.e., the P-interface processor 222) implements an A11 interface $304_1$, which is used to provide a signaling connection (e.g., user datagram protocol (UDP)) between the PCF 108 and PPRC 116. The first R-P interface $302_1$ also comprises an A10 interface $306_1$, which forms a path (e.g., a generic routing encapsulation (GRE) tunnel) for user traffic between the PCF 108 and the PPRC 116.

A second R-P interface $302_2$ is subsequently formed between the R-interface processor 224 of the PPRC 116 and the PDSN $112_1$. The second R-P interface $302_2$ (i.e., the R-interface processor 224) implements an A11 interface $304_2$, which is used to provide a signaling connection (e.g., user datagram protocol (UDP)) between the PPRC 116 and PDSN 112. Additionally, the second R-P interface $302_2$ comprises an A10 interface $306_2$, which forms a path (e.g., a generic routing encapsulation (GRE) tunnel) for user traffic between the PPRC 116 and the PDSN 112. The R-P interfaces 302 are formed over a private IP network 110 of the service provider 120. Moreover, the illustrative embodiment of FIG. 3 is applicable for any physical embodiment of the PPRC 116, whether the PPRC 116 is a switch, or otherwise formed on individual boards co-located with each PCFs 108. Details describing the formation of the first and second R-P interfaces $302_1$ and $302_2$ are described below with regard to FIGS. 4-7.

The PPRC controller 116 and associated program 130 are transparent from the perspective of both the PCFs 108 and PDSNs 112. That is, from the perspective of each PCF 108, the PPRC controller 116 acts as a PDSN 112, and the PCFs 108 cannot differentiate between the PPRC 116 and the PDSN 112. Similarly, from the perspective of each PDSN 112, the PPRC controller 116 acts as a PCF 108, and the PDSNs 112 cannot differentiate between the PPRC 116 and the PCFs 108.

Each PCF 108 is configured with the address of the PPRC 116, as opposed to having to be configured with the addresses of the available PDSN's 112 in the private IP network 110.

From the perspective of a PCF, the PPRC address appears as a PDSN address. As such, the risk of incorrectly configuring the PCFs 108 is greatly reduced. Moreover, each PCF 108 need only be configured once with the PPRC (i.e., PDSN) address, thereby eliminating the requirement of updating the PCFs 108 each time a PDSN is added or removed from the private IP network 110.

In one embodiment, each PPRC 116 is provided with a table containing entries of all of the available PDSNs 112. The PDSN's 112 may have various service capabilities, such as VPN or prepaid services, which are noted in corresponding PDSN table entries in the AAA server 118. Accordingly, the PPRC 116 is able to identify a user of a MS 102, and select an appropriate PDSN based on the type of services required by a MS user, as opposed to the device orientated results of the MS-IMSI modulo N computation.

Figure 4:
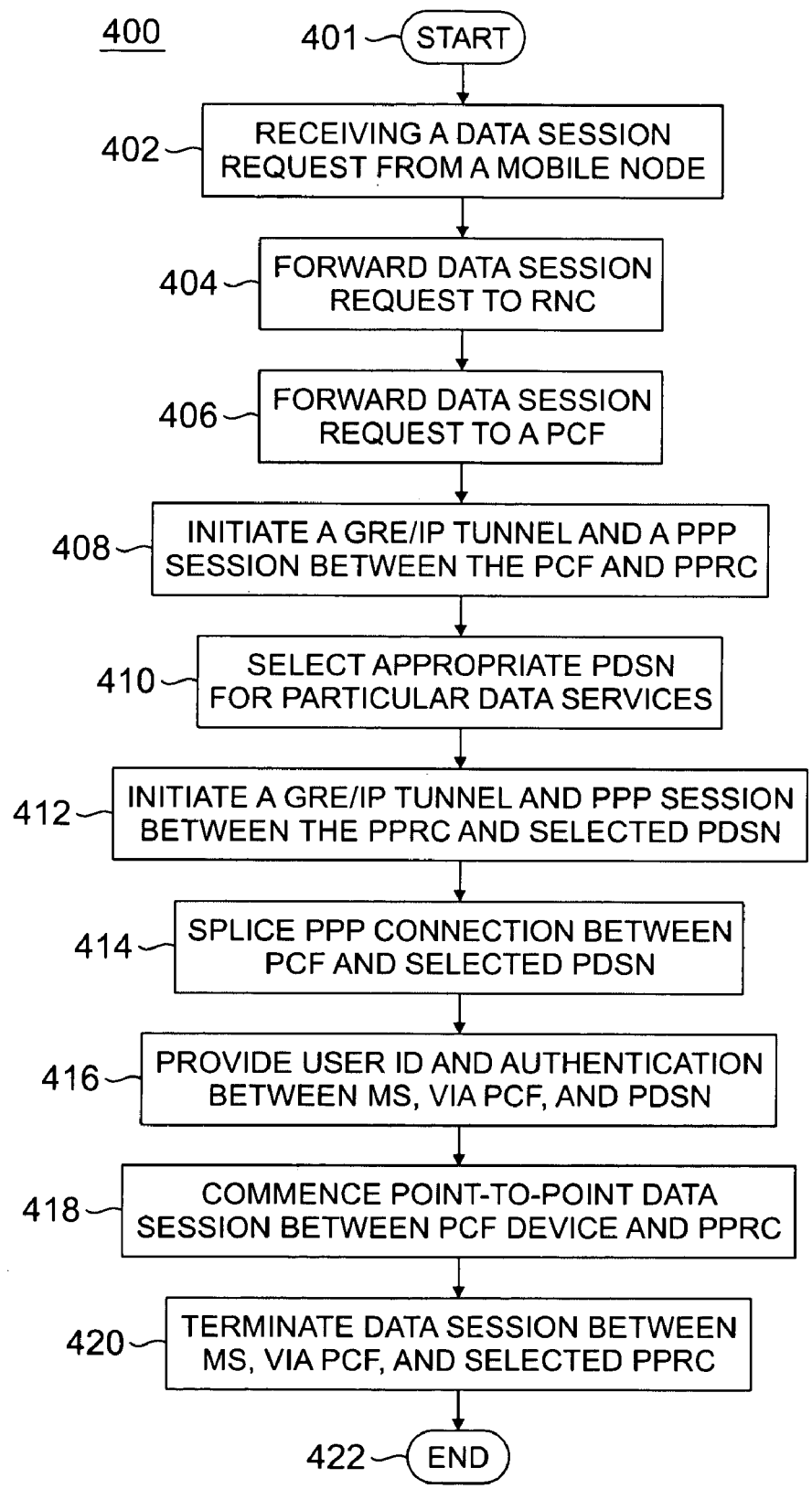
FIG. 4 depicts a flow chart of a method of providing a data session for a mobile station node.

FIG. 4 depicts a flowchart of a method 400 of providing a data session for a mobile station node 102. The method 400 starts at step 401, and proceeds to step 402 where a subscriber to a wireless service provider 120 initiates a data session from a mobile station 102. It is noted that a mobile station 102 may have multiple data sessions. In such instances, the mobile station 102 has multiple mobile nodes respectively initiating such multiple data sessions. For purposes of better understanding the invention, method 400 is described as a single session from a mobile node 102. The method 400 then proceeds to step 404.

At step 404, the mobile node forwards the data session request to the radio network controller (RNC) 106. At step 406, the RNC forwards the data session request to the PCF 108. At step 408, the PCF 108 initiates a GRE/IP tunnel between the PCF 108 and PPRC 116.

Specifically, the PPRC 116 intercepts PPP control messages and terminates the PPP session after exchanging link control protocol (LCP) and PPP authentication messages with the MS 102. Once the LCP and PPP authentication phase is completed, the PPRC 116 acquires the user identity expressed as NAI (i.e., user @realm). The PPRC 116 associates the NAI with the GRE session obtained using the A11 signaling. The PPRC 116 then uses the NAI to determine the "best suitable" PDSN 112 for the user, as discussed below in further detail.

Figure 5:
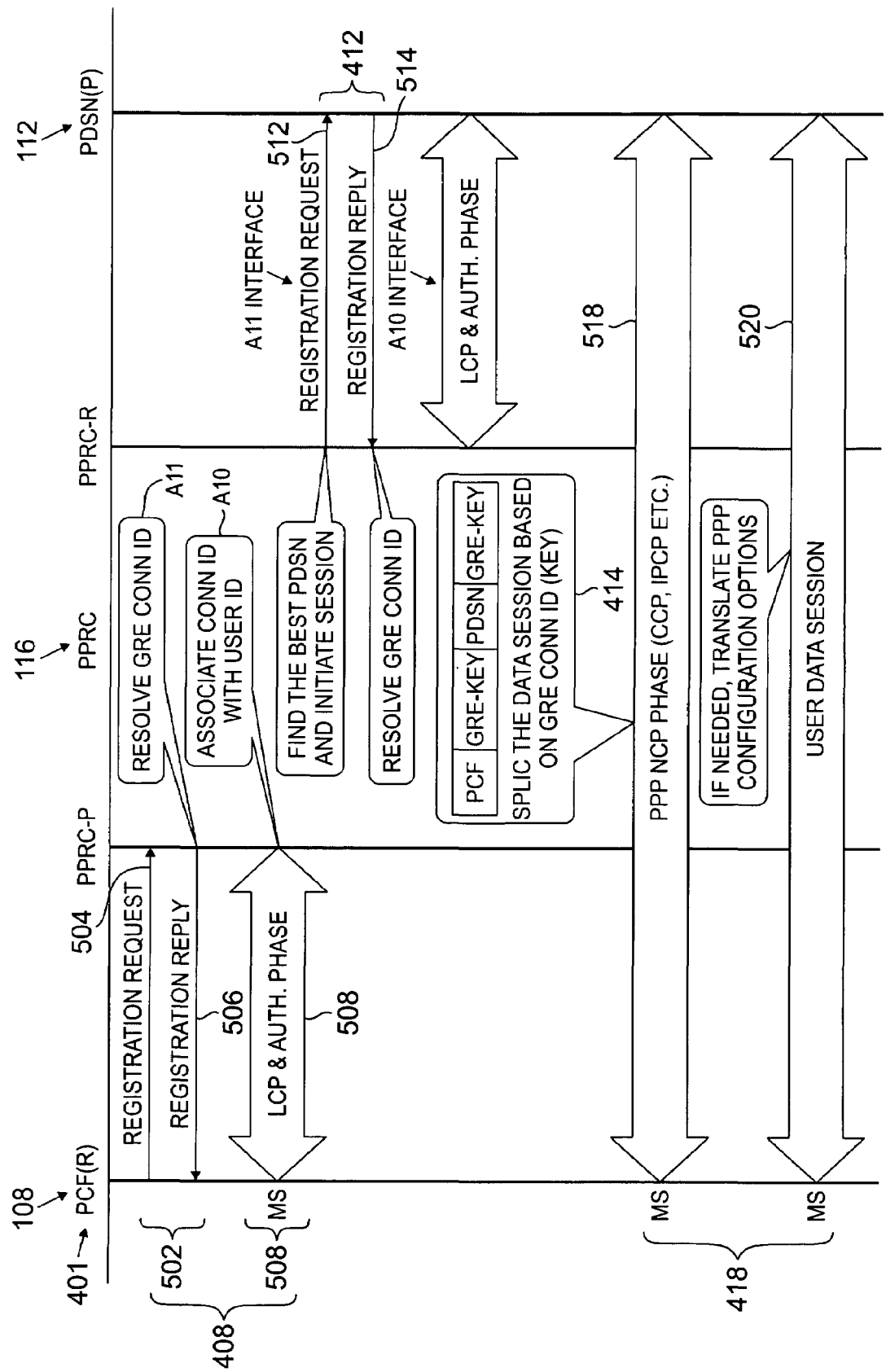
FIG. 5 depicts a flow diagram illustrating various steps of the method of FIG. 4.

FIG. 5 depicts a flow diagram illustrating various steps of the method 400 of FIG. 4. The flow diagram of FIG. 5 is segmented by various components required to provide a data session within the scope of the invention. In particular, a PCF 108, the P and R interfaces of a PPRC 116, and a PDSN 112 are shown at the header of FIG. 5. Arrows between the components indicate communications therebetween, where thin arrows represent single communications and thick arrows represent a set of communications. It is noted that the arrows having the designation "MS" refers to messages originating at the mobile station 102.

Step 408 of method 400 includes steps 502 and 508, which respectively represent establishing an A11 signaling interface and the A10 bearer interface. At steps 504 and 506, the A11 interface 304 of the R-P interface 302 (i.e., the first A11 interface 304, of the first R-P interface 302$_1$ of FIG. 3) is established between the PCF 108 and the PPRC 116, while at step 508, the A10 interface is provided as shown below with regard to FIGS. 6 and 7.

More specifically, at step 504, the PCF 108 sends a registration request to the PPRC 116, which resolves path connection identification, i.e., a GRE connection ID. Once the GRE connection ID is resolved by the PPRC 116, at step 506, the registration reply is sent back to the PCF 108, thereby establishing the first A11 interface 304, to provide a signaling connection between the PCF 108 and the PPRC 116. The GRE connection ID identifies the connection that both the PCF 108 and PPRC 116 use to exchange information packets.

Figure 6:
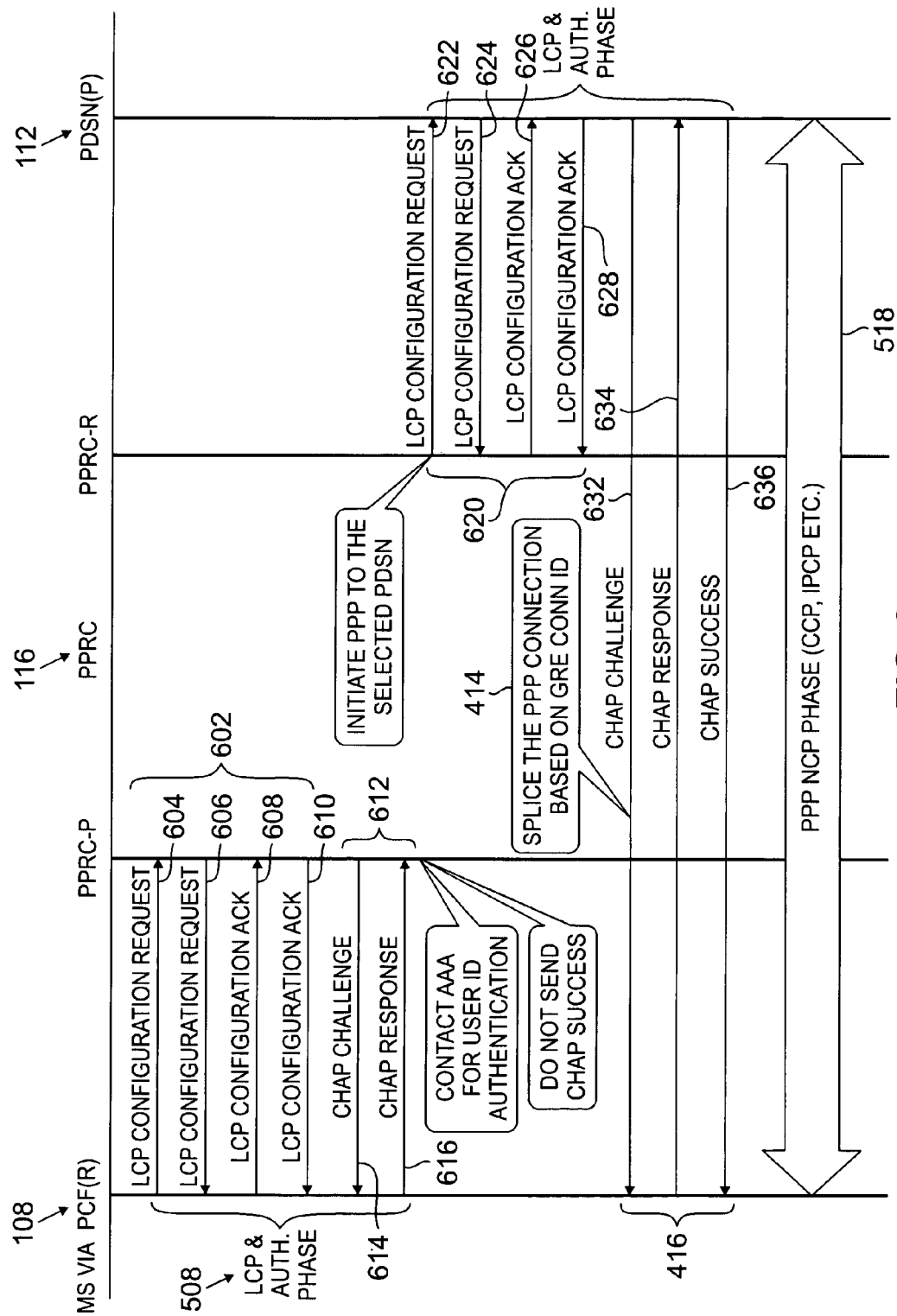
FIG. 6 depicts a flow diagram illustrating a first embodiment of various steps of the flow diagram of FIG. 5.

FIG. 6 depicts a flow diagram illustrating a first embodiment of various steps of the flow diagram of FIG. 5. FIG. 6 is the same layout as shown in FIG. 5, except various steps of FIGS. 4 and 5 are shown in detail. Referring to FIG. 6 together with FIGS. 4 and 5, step 508 of FIG. 5 is shown in detail.

At step 508, the A10 interface 306 of the R-P interface 302 (i.e., the first A10 interface 306$_1$ of the first R-P interface 302$_1$ of FIG. 3) is established. More specifically, at step 508, link control protocol (LCP) configuration 602 and user ID authentication 612 is provided to associate the unique user ID with the GRE connection ID. The A10 interface provides a path for user traffic between the PCF 108 and the PPRC 116. Further, the LCP establishes, configures, and tests data-link connections. Prior to establishing communications over a point-to-point link, each end of the PPP link must send out LCP packets. The LCP packet either accepts or rejects the identity of its linked peer, agrees upon packet size limits, and looks for common configuration errors. Once the LCP packet accepts the link, traffic can be transported between connected components of the network.

In particular, at step 604, the MS 102, via the PCF 108, sends a LCP configuration request to the PPRC 116. At step 606, the P-interface of the PPRC 116 also sends a configuration request to the PCF 108. During the LCP configuration, both endpoint components (e.g., MS 102 (via the PCF 108) and PPRC 116) mutually select and agree on a user identification and authentication technique. Once a user identification and authentication technique, among other configuration properties are established between the PPRC 116 and PCF 108, at steps 608 and 610, the PPRC 116 and MS 102, via the PCF 108, send acknowledgement messages, thereby accepting the identity and configuration requirements between the endpoint components.

Figure 7:
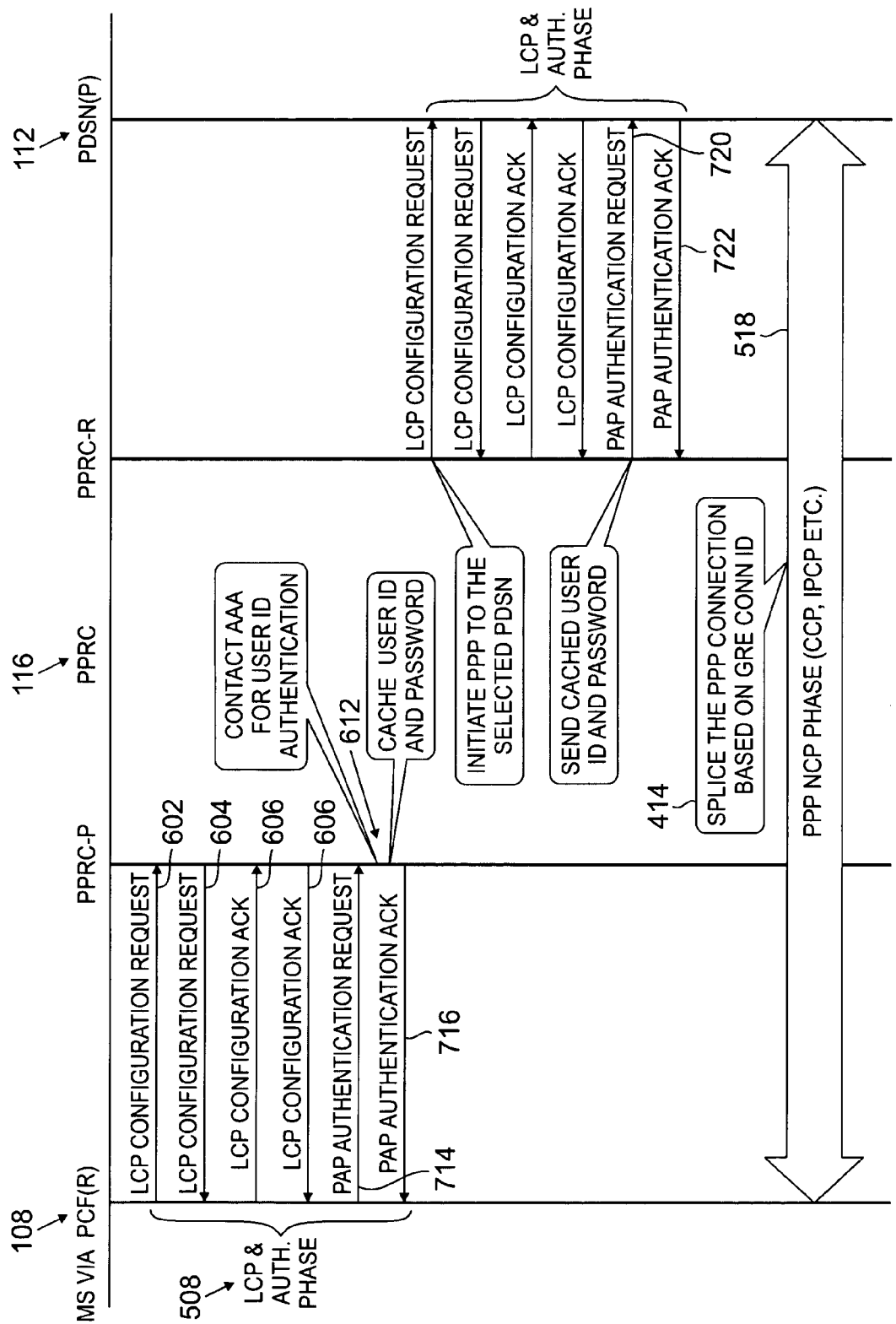
FIG. 7 depicts a flow diagram illustrating a second embodiment of various steps of the flow diagram of FIG. 5.

At step 612, user identification and authentication is provided. User identification is determined by the network access identifier (NAI) in the packet header. User authorization may be performed by various techniques known in the art, such as CHAP (challenge-handshake authentication protocol), PAP (password authentication protocol), MS-CHAP® (Microsoft Corporation's version of CHAP), among others. FIG. 6 illustrates user identification and authentication of step 612 using CHAP, while FIG. 7 illustrates user identification and authentication of step 612 using PAP, as discussed below in further detail.

Referring to FIG. 6, at step 614, the PPRC 116, which is functioning as a P-Interface, sends a CHAP challenge message to the connection requesting MS 102 via the PCF 108. Under CHAP authentication, the password of the user remains with the user and the AAA server 118, such that the password is not exchanged between the PPRC 116 and MS 102 via the PCF 108. Rather, at step 614, the PPRC 116 sends a random number (e.g., 128-bit number) to the PCF 108, which represents the challenge. The MS 102 computes a hash value from the random number using a hashing algorithm and a password, and at step 616, the MS 102, via PCF 108, responds back to the PPRC 116 with the hash value.

The AAA client 212 of the PPRC 116 receives the authorization information from the user, and contacts the AAA server 118 for user authentication and services. Specifically, the AAA client 212 sends a challenge and response to the AAA server 118. The AAA server 118 then computes a hash value using the challenge and a password value stored therein. The AAA server 118 then compares the computed hash value with the supplied one. If the hash values are equal, then the user is identified and authenticated.

It is noted that the PPRC 116 does not send a CHAP success message back to the MS 102 via the PCF 108. If a CHAP success message were to be sent back to the MS 102 (via PCF 108) by the PPRC 116, then a PPP connection would be improperly initiated between the MS 102 (via the PCF 108) and PPRC 116, rather than the MS 102 (via PCF 108) and a selected PDSN 112. Therefore, the PPRC 116 does not terminate the authentication process by providing a success message. It is also noted that at step 616, when the MS 102 (via the PCF 108) sends the CHAP response, the network access identifier (NAI) is also sent to the PPRC 116. The NAI is used to identify the user. Once the user is identified and authenticated, the method 400 proceeds to step 410.

FIG. 7 depicts a flow diagram illustrating a second embodiment of various steps of the flow diagram of FIG. 5. In particular, FIG. 7 is the same as FIG. 6, except that at step 612, the user authentication is provided by PAP authentication. PAP authentication differs from CHAP in that a password is exchanged between the endpoint components.

In particular, at step 714, the MS 102, via PCF 108, sends the user NAI and a PAP authentication request, which includes the password of the user. The PPRC 116 receives the PAP authentication request and contacts the AAA server 118 to verify the user password. If the sent password matches the password corresponding to the user ID stored at the AAA server 118, at step 716, the PPRC 116 caches the user ID and password, and sends a PAP authentication acknowledgement to the PCF 108. In instances where the passwords do not match, the session is terminated. Once the user is authenticated, the method 400 proceeds to step 410.

Referring to FIG. 4, at step 410, the PPRC 116 selects an appropriate PDSN for the particular data services requested by the user. The PPRC 116 may employ various techniques to determine the most suitable PDSN 112. Such techniques include internal table lookup based on user and/or realm, a DNS (domain name server) lookup using realm (i.e., vpn.svc, mvno.svc), an AAA server 118 lookup using NAI, a user profile database lookup based on NAI or realm, among others. In instances where the AAA server 118 is consulted, the AAA server record for the user NAI returns a PDSN IP address. The AAA server 118 may store the information statically or dynamically, as known in the art. It is noted that the AAA server 118 may also store an attribute list defining the types of data services each PDSN 112 is capable of performing. Such data services may include virtual private networks (VPNs), prepaid services, and the like.

Recall, that the PPRC 116 has already identified the user by the NAI at step 508. The PPRC 116 selects an appropriate PDSN 112 to fulfill the data service request by the user. That is, the PPRC 116 first identifies those PDSNs that are capable of providing the type of services (VPN, prepaid services, and the like) for that particular user, and then selects the "best" PDSN of such identified PDSN's based on various factors, which are discussed below in further detail. The method 400 then proceeds to step 412.

At step 412, a GRE/IP tunnel is established between the PPRC 116 and the selected PDSN 112. FIG. 5 also illustrates the various steps for providing the A11 signaling interface between the PPRC 116 and the selected PDSN 112, as similarly discussed above with regard to steps 504 and 506 with regard to the A11 interface between the PCF 108 and PPRC 116.

In particular, the PPRC 116 acts as an R-interface from the perspective of the selected PDSN 112, while the PDSN acts as the P-interface from the perspective of the PPRC 116. That is, at steps 512 and 514, the second A11 interface 304₂ of the second R-P interface 302₂ of FIG. 3 is established. At step 512, the PPRC 116 sends a registration request to the selected PDSN 112, which allocates path connection identification, i.e., a GRE connection ID. The GRE connection ID identifies the connection that both the selected PDSN 112 and PPRC 116 use to exchange information packets. It is noted that the value of the PPRC-PDSN GRE connection ID differs from the value of the GRE connection ID as between the PCF 108 and the PPRC 116. Once the GRE connection ID is resolved by the selected PDSN 112, at step 514, the registration reply is sent back to the PPRC 116, thereby establishing the second A11 interface 304₂ to provide a signaling connection between the PPRC 116 and the selected PDSN 112. The method 400 then proceeds to establish the A10 interface at step 620 of FIG. 6.

At step 620, the A10 interface 306 of the R-P interface 302 (i.e., the second A10 interface 306₂ of the second R-P interface 302₂ of FIG. 3) is established between the PPRC 116 and selected PDSN 112. More specifically, at step 620, link control protocol (LCP) configuration 602 is provided. The A10 interface provides a path for user traffic between the PCF 108 and the PPRC 116 for packet data services.

In particular, at step 622, the PPRC 116 sends a LCP configuration request to the selected PDSN 112. At step 624, the selected PDSN 112 also sends a configuration request to the PPRC 116. During the LCP configuration, both endpoint components (e.g., selected PDSN 112 and PPRC 116) agree on a user identification and authentication technique. It is noted that the PPRC 116 and selected PDSN 112 agree to utilize the same user ID authentication technique (e.g., CHAP or PAP) selected in step 508, as discussed above. Once a user identification and authentication technique, among other configuration properties are established between the PPRC 116 and PCF 108, at steps 626 and 628, the PPRC 116 and PCF 108 send acknowledgement messages, thereby accepting the identity and configuration requirements between the endpoint components. Once the LCP configuration is completed, the method proceeds to step 414 (FIG. 4).

At step 414, the first A10 interface between the PCF 108 and the PPRC 116, and the second A10 interface between PPRC 116 and the selected PDSN 112 are spliced to form a PPP connection using the GRE connection IDs. Specifically, the PPRC 116 has two GRE connection ID's (keys); a PCF GRE key and a PDSN GRE key. The data tunnel splicer 216 of the PPRC 116 receives packets containing the PCF GRE connection ID in the header of each packet, and replaces (i.e., "splices") the PCF GRE key with the PDSN GRE key. Accordingly, a single A10 interface is provided between the PCF 108 and the selected PDSN 112. The PPRC 116 also changes the source and destination IP addresses to PPRC-R and PDSN IP addresses, respectively. The reverse direction works in an analogous manner. Furthermore, the unique user ID is now associated with the GRE connection ID, thereby providing a data path between the PCF 108 and the selected PDSN 112.

Figure 13:
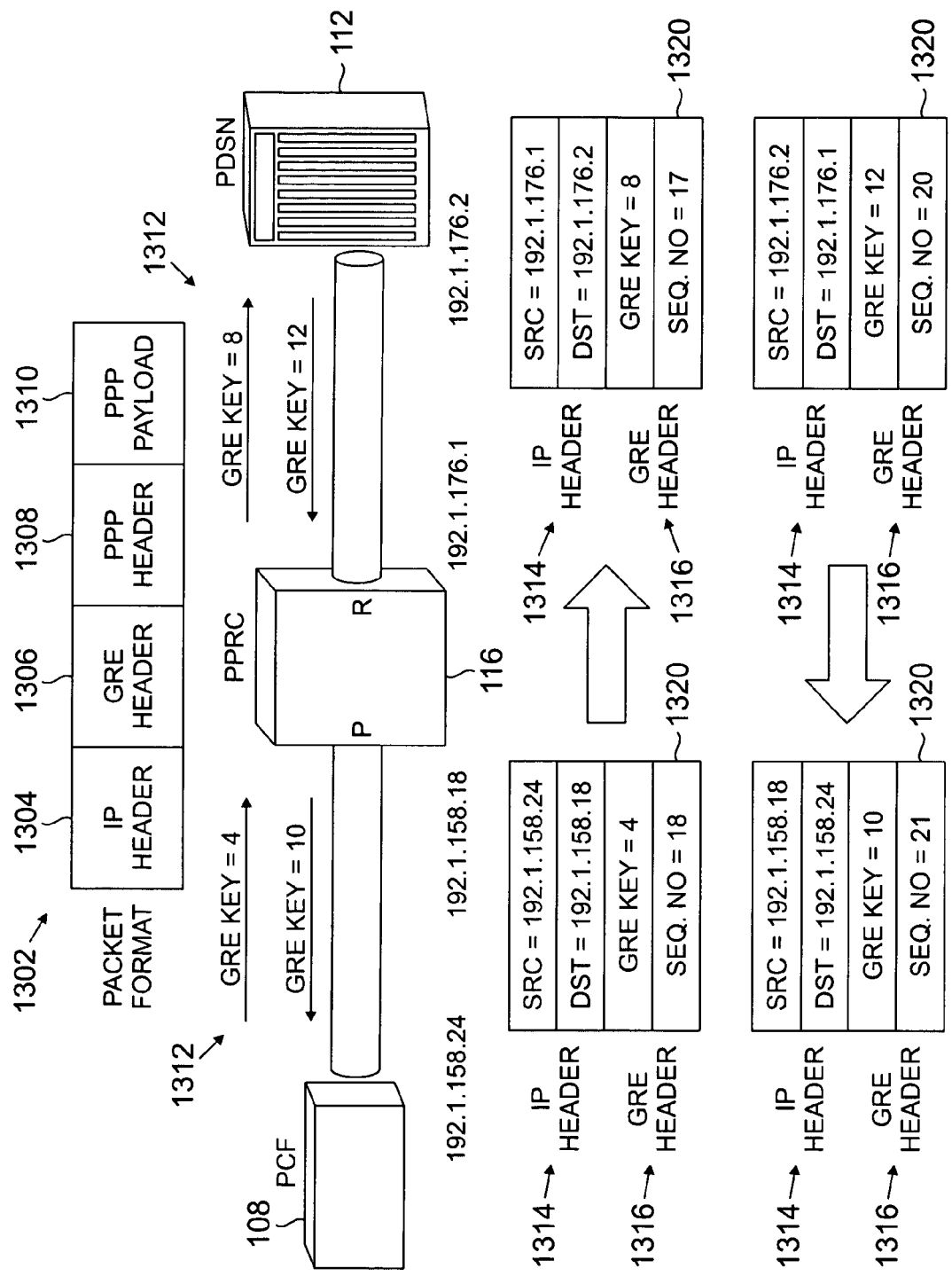
FIG. 13 depicts a block diagram illustrating point-to-point protocol (PPP) splicing in accordance with the present invention.

FIG. 13 depicts a block diagram illustrating point-to-point protocol (PPP) splicing in accordance with the present invention. A GRE packet 1302 comprises an IP header 1304, a GRE header 1306, a PPP header 1308, and a PPP payload 1310. The GRE packet 1302 is forwarded over the P network 110 between the PCF 108 and the PDSN 112. It is noted that GRE connection ID and GRE key are synonymous and used interchangeably herein. FIG. 13 also shows exemplary GRE keys 1312 that have been negotiated between the PCF 108 and the PPRC 116 (step 502 of FIG. 5) and between the PPRC 116 and the PDSN 112 (step 412 of FIG. 5), as well as the fields in the IP headers 1314 and GRE headers 1316 that are changed when splicing is performed.

As part of the splicing operation, when a packet is received from the PCF 108, the PPRC 116 changes the source IP address (e.g., 192.1.158.24) to that of its own (on the R interface towards the PDSN 112, e.g., 192.1.176.1). The destination IP address (e.g., 192.158.18) is also changed to that of the PDSN 112 (e.g., 192.1.176.2). Additionally, the PPRC 116 changes the GRE key to the one that is to be used on the GRE session to the PDSN 112 (e.g., GRE key=4 changed to GRE key=8).

Similarly, when a packet is received from the PDSN 112, the PPRC 116 changes the source IP addresses (e.g., 192.1.176.2) to that of its own (on the P interface towards the PCF 108, e.g., 192.1.158.18). The destination IP address (e.g., 192.176.1) is also changed to that of the PDSN 112 (e.g., 192.1.158.24). Additionally, the PPRC 116 changes the GRE key to the one that is to be used on the GRE session to the PCF 108 (e.g., GRE key 12 is changed to GRE key 10).

From FIG. 13, it is seen that besides changing the IP addresses and the GRE key, the splicing operation will also involve changing the sequence number 1320 of the GRE header 1306, if it exists. When packets are sent over a GRE tunnel, it is optional to use a sequence number 1320 so that packet losses can be detected. According to the CDMA2000 standards, the sequence number 1320 is set to zero at session startup by both the PCF 108 and the PDSN 112.

FIG. 6 shows details of the LCP exchange between the MS 102 (via the PCF 108) and PPRC 116 and between the PPRC 116 and PDSN 112. Before sessions are spliced, as part of the LCP phase, three messages are sent from MS 102 (via the PCF 108) to PPRC 116 (steps 604, 608, and 616) and vice-versa (steps 606, 610, and 614). However, only two messages are sent from PPRC 116 to PDSN 112 and vice-versa (steps 622 to 628). Because of this, there will be a difference of 1 in the sequence number in both directions on the spliced sessions. To account for the difference, the sequence number on packets from the PCF 108 is decreased by 1 before being sent to the PDSN 112 and the sequence number on packets from the PDSN 112 is increased by 1 before being sent to the PCF 108. Note also that the GRE RFC specifies the use of a GRE checksum as an optional parameter, but CDMA2000 standards do not specify the use of a GRE checksum even as an optional parameter; thus, we do not consider modifications to the checksums.

More specifically, at step 416 of FIG. 4, an A10 bearer interface is established between the PCF 108 and PDSN 112 to provide a PPP connection therebetween. Recall, that the A10 interface provides user ID authentication using an authentication technique such as CHAP, PAP, and the like. FIG. 6 illustrates providing user ID authentication using CHAP, while FIG. 7 illustrates providing user ID authentication using PAP.

Referring to FIG. 6, at step 632, the selected PDSN 112 sends a CHAP challenge to the PCF 108. That is, the splicing step (step 414) allows the user authentication phase to occur between the MS 102 (via the PCF 108) and a selected PDSN 112 via the PPRC 116. The MS 102 uses the hashing algorithm to compute a hash value, and at step 634, the MS 102 (via PCF 108) sends a CHAP response to the selected PDSN 112. The PDSN 112 confirms the proper user ID by contacting the AAA server 118 as discussed above with regard to step 616. Upon confirmation of proper user ID, at step 626, the PDSN 112 sends a CHAP success message to the MS 102 via the PCF 108. Once the MS 102 (via the PCF 108) receives the CHAP success message, the PPP network control protocol (NCP) phase and user data session may be initiated.

Referring to FIG. 7, it is noted that the user authentication process between the PPRC 116 and PDSN 112 is performed by the PAP authentication technique. In particular, at step 720, the cached user ID and password are sent along with a PAP authentication request from the PPRC 116 to the selected PDSN 112. At step 722, the PDSN 112 verifies the password and sends a PAP authentication acknowledgement to the PPRC 116, as is known by those skilled in the art. The method 400 then proceeds to step 414, where the PPP connection is spliced based on the GRE connection IDs, as discussed above.

Referring to FIG. 4, at step 418, a point-to-point data session between the MS 102 (via the PCF 108) and selected PDSN 112 is initiated. In particular, at step 518 the PPP network control protocol (NCP) phase is initiated, where IP control protocol (IPCP), compression control protocol (CCP), and other network control protocols are provided. That is, both sides agree on the parameters to transfer data. It is noted that during the NCP phase, the PPP is sent as provided in the standards. At step 520, the user data session is available for the user to send and receive packetized information over a public IP network 114. As such, the user session is established.

At step 420, the user may terminate the data session. In particular, the PCF 108 sends a registration request to the PPRC 116. In one embodiment, the registration request contains a session lifetime value equal to zero, as well as accounting information (e.g., data session activity time) to the AAA server 118 for proper billing. The PPRC 116 administers the registration request to the various service provider components handling such administrative tasks, and sends a registration reply to the PCF 108 accepting data session termination. At step 422, the user data session is terminated between the PCF 108 and the selected PDSN 112, where the method 400 ends.

One problem that has been observed in the prior art is undesirable bandwidth constraints occurring at the PDSNs 112. Current PCFs 108 are incapable of selecting a PDSN 112 based on either the PDSN's service capabilities, processing capabilities, or bandwidth capacity to handle additional data session. That is, the PCF 108 is device orientated and utilizes the MS IMSI modulo N algorithm, as discussed above. However, by introducing the PPRC 116 into the network 100, the data service becomes user orientated, since the PPRC 116 is able to select a particular PDSN 112 in the network 100 based on the PDSN's service capabilities, present bandwidth, and processing capabilities.

In particular, the PPRC 116 maintains a data session count at each PDSN 112. For example, a particular PDSN 112 may be handling 340 current sessions of a possible 500 data sessions. After the successful splicing of each user session, the PPRC 116 increases the active session count to the PDSN 112. Similarly, when a data session is terminated, the active session count is respectively reduced. Accordingly, the PPRC 116 may select the PDSN 112 having a low data session count, thereby preventing a PDSN 112 from exceeding its capacity and improperly terminating a user data session.

As discussed above, the PPRC 116 also selects an appropriate PDSN 112 based upon the services provided by such PDSN 112, such as VPN, pre-paid services, and/or other value added services (e.g., proxy services, caching services, among others). As such, the PPRC 116 (collectively as a plurality of controller boards, or as a switch) maintains load balancing of the data sessions among the PDSNs 112 in the network 100 in view of their capabilities and current capacity.

Therefore, load balancing improves the quality-of-service (QOS) by reducing over load at a particular PDSN 112, which may cause unexpected termination of some user data sessions.

Moreover, since the PPRC 116 creates a user orientated data session environment, a user who wishes to use a different mobile station (e.g., a laptop of another person) may connect to the appropriate PDSN 112 to participate in the user data services for that particular user, rather than the services previously designated to the mobile station 102. In particular, the user simply logs in and accesses the service provider 120 though the exemplary laptop of another, where the user ID and authentication process discussed above enables appropriate selection of the PDSN 112 based on user type services.

Simple-IP makes it possible for multiple cells or network entry points to connect back to a single PDSN 112. Simple-IP requires that a new address be assigned if users roam outside their own subscriber networks. That is, simple-IP can only guarantee IP address mobility within a restricted geographic area and only within the network of a single wireless provider.

In particular, the mobile stations 102 are capable of maintaining simple IP connectivity as long as the PCFs 108 of a particular service provider 120 are not disjoint at the PDSN level. However, while roaming to areas covered by other service provider networks, the PCFs 108 of each SP 120 are disjoint. Further, even if the PCFs 108 are not disjoint (MS 102 is connected to same SP 120), a data session may still be terminated if one or both PCFs 108 have misconfigured PDSN table entries or the PDSN is at full bandwidth capacity.

Figure 8:
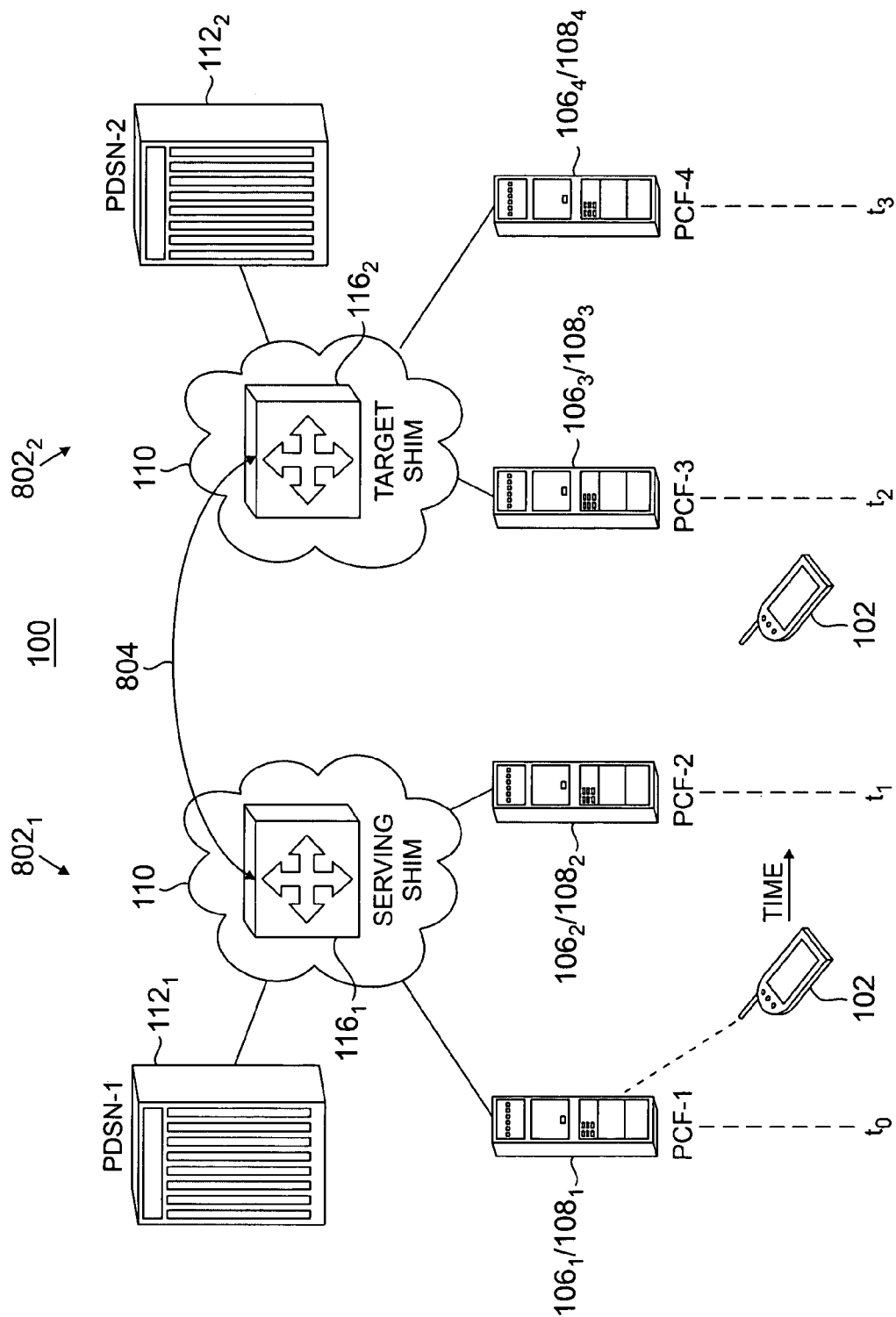
FIG. 8 depicts a block diagram of a wireless communications network having mobile stations using simple IP to facilitate roaming.

FIG. 8 depicts a block diagram of a wireless communications network 100 having mobile stations 102 using simple IP to facilitate roaming. In particular, a first (serving) cluster $802_1$ having a first (serving) PPRC $116_1$ is coupled (arrow 804) to a second (target) cluster $802_2$ having a second (target) PPRC $116_2$. The PPRCs 116 are termed the serving PPRC and target PPRC to reflect the movement of the MS 102 from the serving region $802_1$ to a target region $802_2$. A cluster 802 comprises one or more PDSNs 112 and PCFs 108 interconnected via a PPRC 116. For example, the first cluster $802_1$ illustratively includes one or more PDSN's (e.g., PDSN-1 $112_1$) and a first plurality of PCFs (e.g., PCFs $108_1$ and $108_2$) connected through PPRC $116_1$. Similarly, the second cluster $802_2$ illustratively includes one or more PDSN's (e.g., PDSN-2 $112_2$) and a second plurality of PCFs (e.g., PCFs $108_3$ and $108_4$) connected through PPRC $116_2$. The first and second PPRCs $116_1$ and $116_2$ are able to communicate with each other over the private IP network 110, as discussed above. It is noted that the clusters 802 belong to the same infrastructure provider.

An exemplary mobile station 102 is shown at different times traveling from one service area to another. At time=t0 the mobile station 102 is serviced by the first PCF-1 $108_1$ of the cluster $802_1$. At time=t1 the mobile station 102 is illustratively serviced by the second PCF-2 $108_2$, also within the geographic region of the first cluster $802_1$. At time=t2, the mobile station 102 has roamed outside the geographic region of the first cluster $802_1$ to the coverage area of the second cluster $802_2$, and is serviced by PCF-3 $108_3$. At time=t3, the mobile station travels to a geographic location serviced by PCF-4 $108_4$, also within the geographic region of the second cluster $802_2$.

Handoff of the mobile station 102 between the first and second PCFs $108_1$ and $108_2$ is performed within the same PDSN 112, as is known in the art. That is, the connectivity of the mobile station 102 to the PDSN-1 $112_1$ is not interrupted, since the mobile station 102 is still being serviced at the first cluster $802_1$.

In particular, at time=t1 the PPRC $116_1$ receives a registration request from the second PCF-2 $108_2$. Specifically, for any particular cluster (e.g., cluster $802_1$), any PCF 108 may connect to any available PPRC 116, which selectively connects to a particular PDSN 112 in the private IP network 110 of the cluster 802. As such, both PCF-2 $108_2$ and PCF-1 $108_1$ can reach the same PDSN-1 $121_1$, thereby maintaining a seamless connection. At time=t2, the mobile station is roaming outside the geographical coverage area of the serving cluster $802_1$. The PCF-2 $108_2$ is no longer able to maintain connectivity to the serving PDSN-1 $112_1$ through the serving PPRC $116_1$. In other words, when the MS 102 moves to the second region $802_2$, the simple IP session breaks, since PCF-3 $108_3$ is connected to a cluster different from PCF-2 $108_2$. Therefore, it is not possible for the target PPRC $116_2$ to redirect the session to the serving PDSN $112_1$.

As such, a new R-P session is initiated by the PCF-3 $108_3$. The PCF-3 (i.e., target PCF) $108_3$ receives a data session request from its associated RNC (not shown), and the target PCF-3 $108_3$ establishes the A11/A10 interface connections with the target PPRC (shim) $116_2$, as discussed above. The target PPRC $116_2$ identifies the user and the associated data session from the target PCF-3 $108_3$, and establishes a GRE tunnel 804 to the serving PPRC $116_1$. The new data session is tunneled to the serving PPRC $116_1$ by the target PPRC $116_2$.

Figure 9:
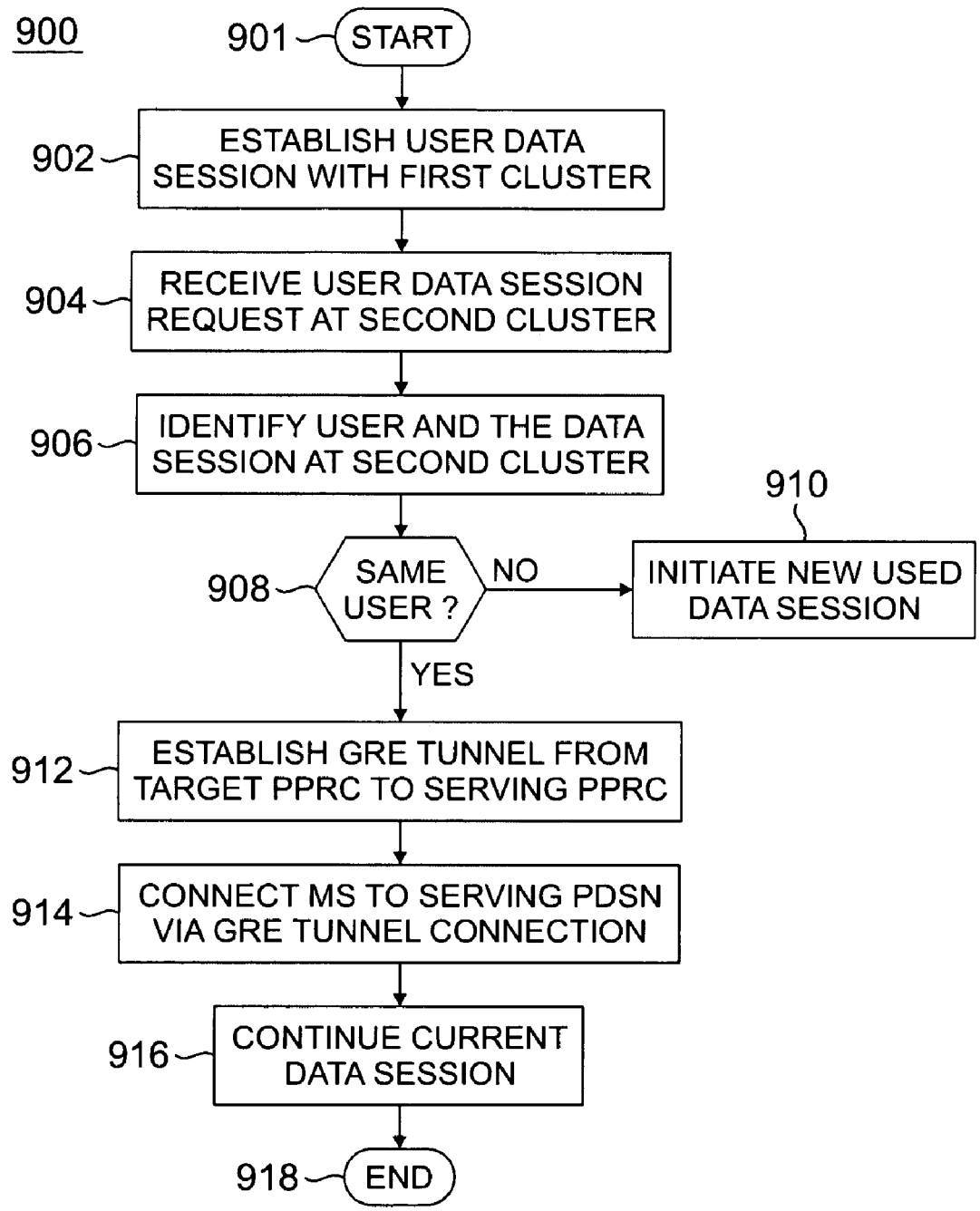
FIG. 9 depicts a flowchart of a method of maintaining an uninterrupted data session during roaming by a mobile station using simple IP.

FIG. 9 depicts a flowchart of a method of maintaining an uninterrupted data session during roaming by a mobile station 102 using simple IP. FIG. 9 should be viewed together with FIG. 8. The method starts at step 901 and proceeds to step 902 where a user data session with a mobile station (MS) 102 is established with a first (serving) cluster $802_1$. At step 904, a second cluster $802_2$ receives a data session request.

At step 906, the second cluster $802_2$ identifies the user and the data session. In particular, at step 908 a query is made to identify the user. If at step 908, the user is not a same user for a data session from the first cluster $802_1$, then, at step 910 a new data session is initiated for that new user at the second cluster $802_2$. It is noted that the second cluster $802_2$ is coupled to the first cluster $802_1$ via GRE tunnel connection 804 of FIG. 8, which provides a communications path for such inquiries and other communications to be made between the two clusters $802_2$ and $802_2$.

If at step 908, the user is identified as the same user for a data session at the first cluster $802_1$, at step 912, a GRE tunnel 804 is established from the target PPRC $116_2$ to the serving PPRC $116_1$. In particular, the PPRC-to-PPRC communicator $216_2$ of the target PPRC $116_2$ sends control messages through its R-interface processor $222_2$ to the P-interface processor $224_1$ of the serving PPRC $116_1$. Likewise, the PPRC-to-PPRC communicator $216_1$ of the serving PPRC $116_1$ sends control messages through its P-interface processor $224_1$ to the R-interface processor $222_1$ of the target PPRC $116_2$.

At step 914, the MS 102 is connected to the serving PDSN $112_1$ through the GRE tunnel 804, and at step 916, the current data session continues without any interruption or disturbance seen by the user. The method 900 then proceeds to step 918, where the method 900 ends. Thus, the simple IP session remains intact even when the MS 102 moves away from the serving cluster.

From a user standpoint of quality of service, the user does not want to have any degradation or interruption of services during a data session. Under current data sessions using wireless mobile stations 102, when a PDSN fails, any data sessions handled by such failed PDSN 112 are terminated. The only possible recovery is to re-initiate the data session from the mobile station 102, where the session would be redirected to a working PDSN 112. However, the simple IP address of the mobile station 102 may change, which forces the user of the MS 102 to have to login again.

The use of simple IP does not guarantee that the MS 102 will keep the same IP address when roaming. Mobile-IP facilitates roaming wireless connections by allowing a mobile station 102 to use two IP addresses. The first IP address is a fixed home address, and the second IP address is a foreign or "care of" address, which changes at each new point of attachment. When a mobile node 102 connects to the wireless network, the mobile node 102 enters through an arbitrary PDSN called the foreign agent (FA).

During a process called "agent discovery" the mobile node 102 locates or "discovers" both its home agent and foreign agent, and registers its location. In the current 2.5G and 3G architectures, a tunnel is established between the foreign agent and the home agent on behalf of the mobile node 102. The home agent intercepts packets sent to a mobile node's home address and forwards the packets via the tunnel to the registered care-of address (i.e., foreign agent), which routes the information to the mobile nodes current location. Each time the mobile node connects with a new foreign agent, a tunnel is established back to the home agent.

Moreover, each time the mobile node moves to another location under the coverage of a different PDSN/FA, the home agent and foreign agent must re-register. The registration time to connect to a new foreign agent when going over the public Internet is time consuming. Moreover, during the registration process at the foreign agent, the mobile node 102 is not able to receive any data packets handed off from the first foreign agent (serving PDSN). Similarly, the mobile node is not able to transmit any data packets to the new foreign agent (target PDSN), since it is not yet connected.

Figure 10:
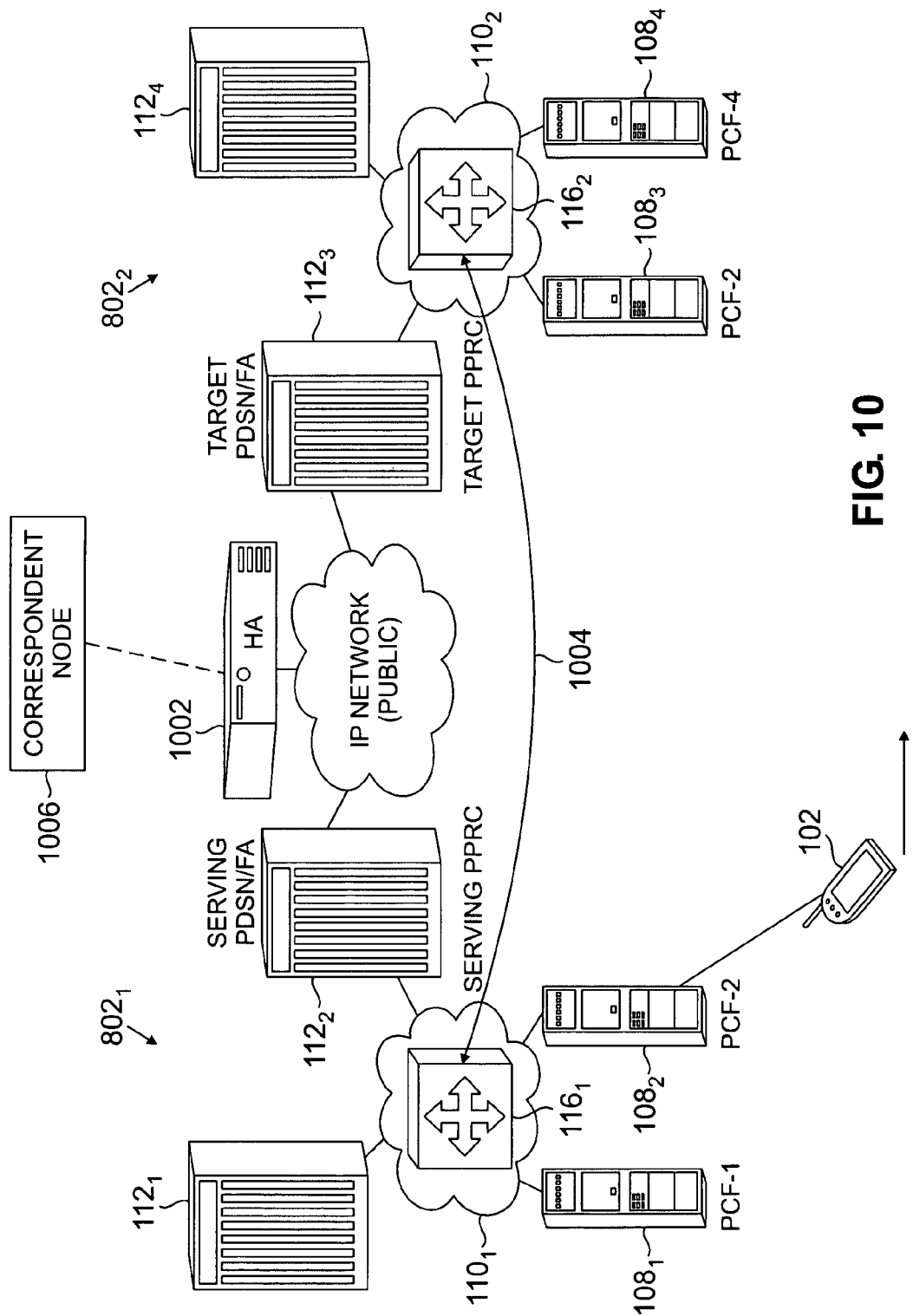
FIG. 10 depicts a block diagram of a wireless communications network having mobile stations using mobile IP to facilitate roaming.

FIG. 10 depicts a block diagram of a wireless communications network 100 having mobile stations 102 using mobile IP to facilitate roaming. In particular, FIG. 10 depicts two clusters 802$_1$ and 802$_2$ coupled to each other via an IP network 114, such as the Internet. Each cluster 802$_1$ and 802$_2$ has a plurality of PCFs 108, a plurality of PDSNs 112, and a PPRC (shim) 116 coupled between the respective PCFs 108 and PDSNs 112, as similarly described above with regard to FIG. 8.

For purposes of understanding the invention, PDSN 112$_2$ is illustrated as being a serving PDSN/FA, which is coupled to the first private IP network 110$_1$ of the first cluster 802$_1$. Similarly, PDSN 112$_3$ is illustrated as being a target PDSN/FA, which is coupled to the second private IP network 110$_2$ of the second cluster 802$_2$. A home agent 1002 is coupled to the PDSNs 112 of each cluster 802 via the public IP network 114. For purposes of illustration, an exemplary mobile station 102 is shown roaming from the PCF-2 108$_2$ of the first service provider 120$_1$ to the PCF-3 108$_3$ of the second service provider 120$_2$. The home agent 1002 is coupled to a correspondent node 1006, which represents a data source for packetized information located illustratively on the Internet. That is, the correspondent node 1006 represents the source of data the user of the MS 102 accessing during the session.

Figure 11:
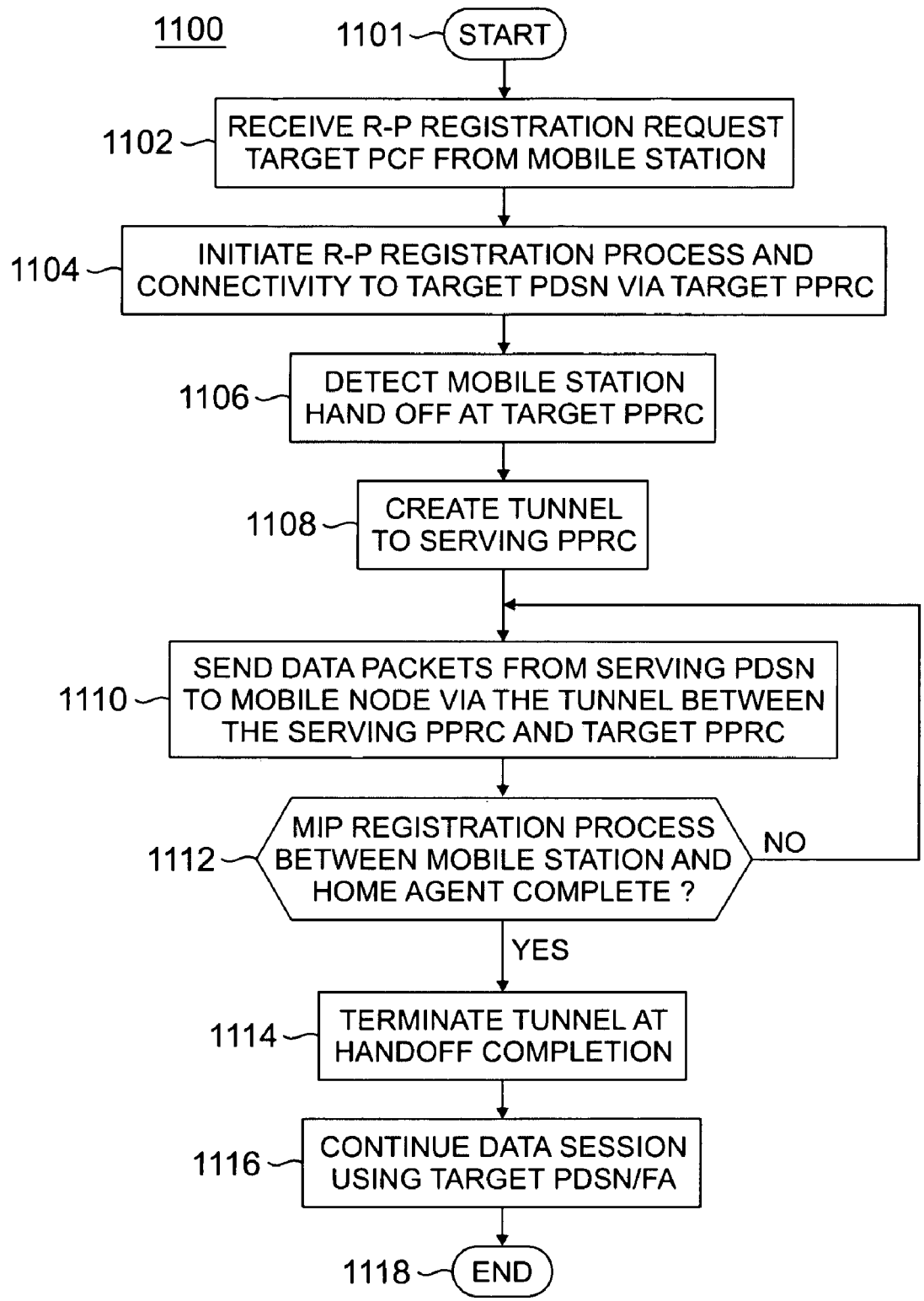
FIG. 11 depicts a flowchart of a method of maintaining an uninterrupted data session during roaming by a mobile station using mobile IP.

FIG. 11 depicts a flowchart of a method 1100 of maintaining an uninterrupted data session during roaming by a mobile station using mobile IP. FIG. 11 should be viewed along with FIG. 10. In particular, method 1100 provides a low latency hand-off process, while keeping the connections alive and free from interruption during handoff.

The method 1100 starts at step 1101, where a mobile node 102 is having a data session at a current serving network 110$_1$ and is roaming to another location handled by another serving network 110$_2$. Referring to FIG. 10, the MS 102 is accessing the correspondent node 1006 during a data session from a serving PDSN/FA 112$_2$, via a serving PPRC (shim) 116$_1$ and a serving PCF (e.g., PCF-2 108$_2$), as discussed above with regard to FIGS. 4-7.

At step 1102, the MS 102 has relocated to a destination having coverage by the second IP network 110$_2$. A target PCF (e.g., target PCF-3 108$_3$) receives an R-P registration request to continue the data session, and at step 1104, the target PCF-3 108$_3$ initiates the R-P registration process with the target PDSN/FA 112$_3$, through the target PPRC 116$_2$, as discussed above with regard to FIGS. 4-7.

At step 1106, the target PPRC 116$_2$ detects the user data session and identifies the data session as a session hand-off by using PANID/CANID (previous/current access network identifiers) identifiers from the registration process, as known in the art. In particular, the target PPRC 116$_2$ identifies the serving PPRC 116$_1$ from the PANID information, and at step 1108, the target PPRC 116$_2$ generates a GRE tunnel 1004 to the serving PPRC 116$_1$.

At step 1110, data packets destined for the MS 102 are routed from the serving PDSN 112$_2$ to the mobile node 102 via the GRE tunnel 1004 formed between the serving PPRC 116$_1$ and the target PPRC 116$_2$. In particular, the home agent 1002 does not yet know that a handoff has occurred. As such, the home agent 1002 routes data packets to the serving foreign agent at the serving PDSN 112$_2$. The serving PPRC 116$_1$ splices the GRE tunnel 1004 between the serving PDSN 112$_2$ and the target PPRC 116$_2$. The target PPRC 116$_2$ sends the data session packets to the target PCF-3 108$_3$, which further sends the packets to the mobile node 102, via the target RNC (not shown). Step 1110 continues for the entire transition (i.e., handoff) period.

At step 1112, the target PPRC 116$_2$ monitors for completion of the mobile IP (MIP) registration process between the mobile node 102 and the home agent 1002. If the registration process is not complete, step 1110 continues as discussed above. Once the MIP registration process is complete, at step 1114, the target PPRC 116$_2$ updates the serving PPRC 116$_1$, awaits an acknowledgement, and terminates the GRE tunnel 1004 between the target PPRC 116$_2$ and the serving PPRC 116$_1$.

At step 1116, the MIP registration and handoff is complete, such that the user may continue the data session at the target PDSN/FA 112$_3$, which now becomes the serving PDSN/FA. In particular, the home agent 1002 receives the data packets from the correspondence node 1006 and forwards them directly to the target foreign agent, such that the target PDSN 112$_3$ sends the packets to the mobile node 102, rather than the serving PDSN 112$_2$ as during the MIP registration/transition period. That is, after the handoff, the packets are sent from the correspondent node 1006 to the home agent 1002, through the public network 114 to the target PDSN 112$_3$. The target PDSN 112$_3$ sends the packets to the PCF-3 108$_3$ via the target PPRC 116$_2$, to the MS 102. The method 1100 then proceeds to step 1118, where the method 1100 ends.

Accordingly, the mobile node 102 maintains its current fixed EP address and is able to continue the data session during handoff, without interruption. Moreover, the use of the serving and target PPRCs 116$_1$ and 116$_2$ circumvent the long registration process at the foreign agent 112$_1$ by quickly initiating a GRE tunnel 1004 therebetween, which provides an alternative path for continuing the data session in a seamless manner from the perspective of the user. It is noted that during the transition period (i.e., handoff), the implementation of the serving and target PPRCs 116 enable the mobile node 102 to transmit and receive data packets from the serving PDSN/FA.

In an instance where a PDSN 112 fails in the current wireless network architecture, all of the data sessions associated with such failed PDSN are terminated. Thus, the current users are abruptly interrupted during their data session. The only possible recourse is to reinitiate the data session from the mobile station 102 with a working PDSN 112.

A PPRC 116, when introduced in the network, can be used to automatically recover from PDSN 112 failures without terminating existing data sessions. To support automatic fault-recovery, the PPRC 116 is connected to PDSN 112 pairs. In each pair, one PDSN 112 acts as the master and the other as the backup. The automatic fault recovery process works as follows: The PPRC 116 sets up the initial PPP session to the master PDSN. When this session is setup, the MS 102 acquires an IP address from the master PDSN by using the IPCP protocol. Let us refer to this IP address as $IP_1$. The PPRC 116 monitors the health of the PDSN 112 pair using one of many well-known fault detection techniques. As soon as the PPRC 116 detects the failure of the master PDSN 112, the PPRC 116 sends a PPP session request to the backup PDSN and suggests to the backup PDSN 112 the use of $IP_1$ as the IP address for the MS 102. Note that this is possible with IPCP. Once the session request is accepted, the PPRC 116 splices the PPP session from the MS 102 onto the PPP session that has been established to the backup PDSN 112. All the pre-established transport sessions continue uninterrupted.

Note that it is possible that the backup PDSN 112 refuses the use of $IP_1$ as the IP address for the MS 102. In this case, the backup PDSN 112 will provide a new IP address $IP_2$ to the MS 102 and the MS 102 is forced to use $IP_2$ as its address for further communication. This will lead to termination of the existing transport sessions, such that new sessions will be forwarded through the backup PDSN 112.

Figure 12:
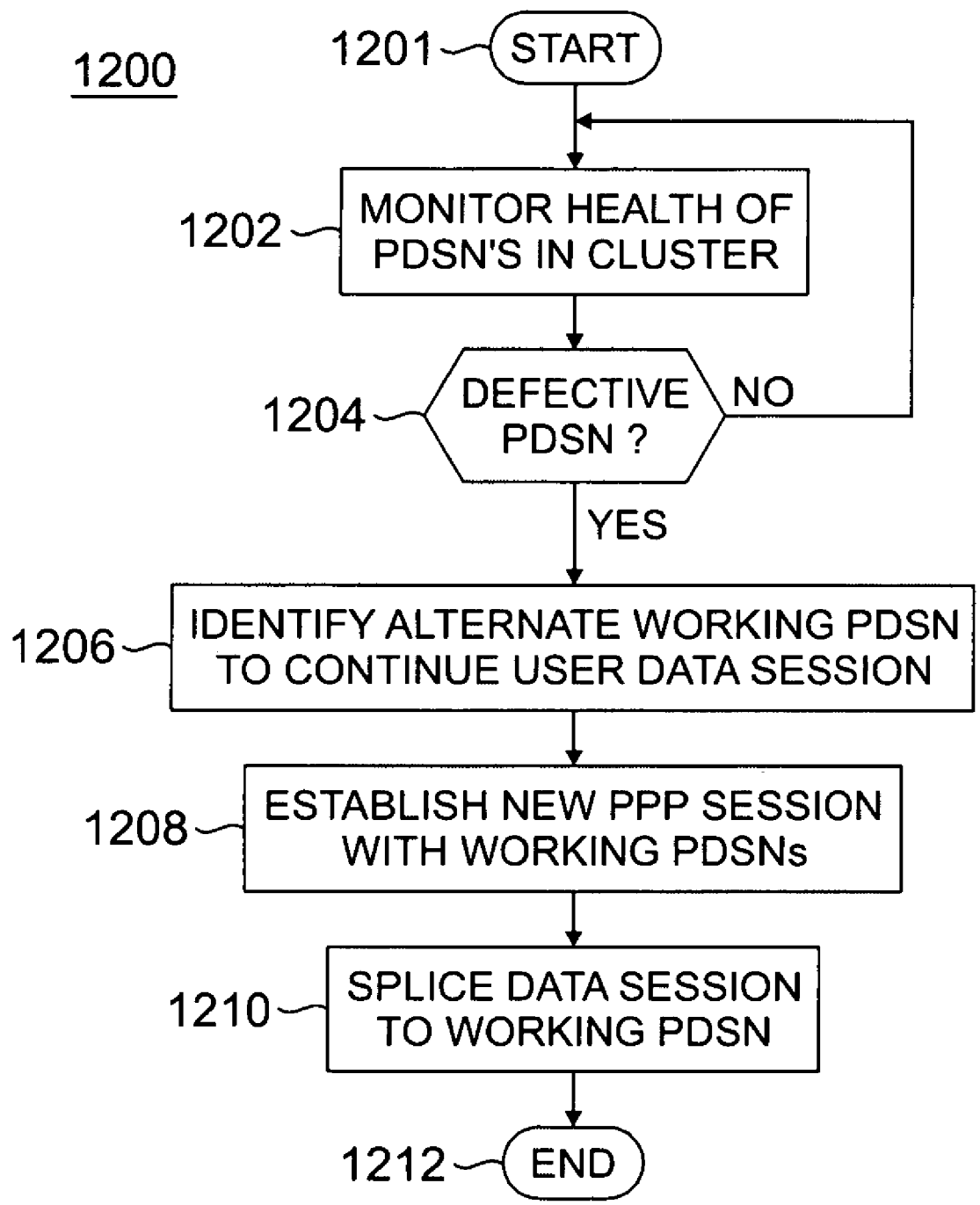
FIG. 12 depicts a flowchart of a method of providing fault tolerance in the communication network of FIG. 1.

FIG. 12 depicts a flowchart of a method 1200 of providing fault tolerance in the communication network of FIG. 1. The method 1200 starts at step 1201 and proceeds to step 1202, where the PPRCs 116 monitors the operational status ("health") of the PDSN's 112 to which they are connected in a cluster 802. In one embodiment, the PPRC 116 periodically sends registration requests to the PDSN's 112, where each registration request has a lifetime setting set to zero.

Specifically, the registration request by the PPRC 116 requires a response, which signifies that the PDSN is in proper working order. Moreover, with the lifetime set to zero, the PDSN 112 will not create a connection for a data session. Alternatively, the PPRC may use simple network management protocol (SNMP) or Internet control message protocol (ICMP) pinging to monitor the operational status of the PDSNs 112. One skilled in the art will recognize that the probing frequency, number of probes unanswered, and timeout periods may be set to timely provide fault isolation, while reducing the risk of false alarms.

At step 1204, if a PDSN fails to respond in a timely manner, the method 1200 proceeds to step 1206, otherwise the PPRC 116 continues to monitor the operational status of the PDSNs 112. At step 1206, the PPRC identifies an alternative working PDSN to continue the user data sessions. At step 1208, the PPRC 116 establishes a new PPP session with the working PDSNs 112.

In particular, the A11 signaling interface is established between the PPRC 116 and each of the working PDSNs 112, and discussed above with regard to method 400 of FIG. 4. The PPRC 116 establishes the A11 and A10 interface with the PDSN by using the user ID at the PDSN end (i.e., the R-interface processor 224) of the PPRC for authenticating the faulted sessions. That is, the PPRC 116 acts as a PCF 108 and registers new connections with each PDSN using new IP addresses.

At step 1210, the PPRC 116 splices the data session to the working PDSN 112, as discussed above with regard to method 400 of FIG. 4. Thereafter, the user may continue with their data session with minimal interruption to the service and at step 1216, the method 1200 ends.

Another feature that may be provided by the implementation of the PPRC 116 is the enrichment of third-party PDSN features. That is, the PPRC may be used to enrich the features of already deployed PDSNs 112 in the network 100. A mechanism to make efficient use of bandwidth across the wireless link is for IP packets to be compressed and transported on the PPP session between the MS 102 and the PDSN. This requires the ability at a PDSN to decompress data compressed by the MS 102, as well as compress data before being sent to the MS 102.

The payload compression/decompression manager 226 of the PPRC 116 provides this function on behalf of the PDSNs. In particular, the payload compression/decompression manager 226 is coupled to one or more encoders and decoders, such as MPEG encoders/decoders, among others that are known to those skilled in the art. Since a PPRC 116 terminates a PPP session and splices PPP frames from one session to another, the PPRC 116 can decompress frames on the PPP session from the PCF 108 before it is sent on the PPP session to the PDSN 112. This way, independent of the PDSNs in the network, a compression/decompression feature can be introduced into the network to efficiently use the wireless bandwidth.

The implementation of the PPRC 116 allows for some additional user-specific services. In particular, a mobile virtual network operator (MVNO) provides only mobile transport services to its customers and does not in general own any mobile network infrastructure. But recently, there is a trend on the part of the MVNOs to own the IP infrastructure in a network (such as the PDSN) so that they can provide value-added IP services to their customers and use the radio network part such as the base-stations, RNC and PCF provided by the mobile network infrastructure providers. Note that the infrastructure that a MVNO owns may as well be a virtual instance on a PDSN that the infrastructure provider owns.

A mobile network infrastructure provider can deploy an PPRC 116 so that customers belonging to different MVNOs can be redirected to the appropriate PDSNs 112. This is possible because the PPRC 116 is capable of performing user identity based redirection. For example, if requests are received from two users with NAI user@mvno1.svc and user@mvno2.svc, where mvno1.svc and mvno2.svc are two different MVNOs, the PPRC 116 can redirect the users to two different PDSNs 112 belonging to mvno1 and mvno2, respectively.

In the mobile voice world, intelligent network nodes (INs) enable pre-paid services for customers based on their telephone numbers. For mobile data users, in general, mechanisms for authorizing pre-paid services is based on the NAI. If the NAI is visible only at the PDSN, as it is in current network deployments, every PDSN in the network 100 should be able to (a) authorize a user for pre-paid services and (b) provide all possible prepaid services that are offered. This solution is very inflexible as it does not allow pre-paid services to be added in an incremental manner; if a new pre-paid service is to be offered, it needs to be added onto all PDSNs 112. It is not possible to introduce a new PDSN in the network to provide only the new pre-paid service. This approach is not cost-effective since it is not possible for the service provider 120 to deploy a few costly PDSNs that support pre-paid services, and for the rest, deploy cheaper PDSNs that do not support pre-paid services.

The PPRC 116 may be used to provide a very simple and cost-effective solution. The PPRC 116 may use the NAI to lookup, for example, the AAA server 118 and decide whether the user is authorized to receive any pre-paid services at all, and if so, the type of pre-paid services the user is authorized to receive. If the user has not signed up for any pre-paid service at all, the request can be redirected to a PDSN that does not support pre-paid services. If the user is to be provided one or more pre-paid services, the request can be redirected to a PDSN that can provide these services.

Although the inventive embodiments have been discussed as a part of the CMDA2000 architecture, the teachings of the invention are also applicable to other wireless architectures, such as the UMTS (Universal Mobile Telecommunications System) standards, which are based on GSM (Global System for Mobile communications).

Under the UMTS architecture, the PCF 108 has functionality commonly known as an SGSN (Support GPRS (general packet radio service) Support Node), while the PDSN has functionality known as a GGSN (Gateway GPRS Support Node). Further, instead of providing a PPP session under CDMA 2000, a packet data protocol (PDP) session, which supports the transfer of packet data over a 3G wireless cellular network, is provided under UMTS. One skilled in the art and informed by the present disclosure will appreciate that the teaching of providing a PPRC 116 in the CMDA2000 architecture is also applicable for implementation as between the SGSNs and the GGSNs in the UMTS architecture in a manner similar to that described above with respect to the PCF 108 and PDSN 112. As such, similar advantages as described herein for implementing a PPRC 116 in the CMDA2000 architecture, also apply to the UMTS architecture.

Although various embodiments that incorporate the teachings of the present invention have been shown and described in detail herein, those skilled in the art can readily devise many other varied embodiments that still incorporate these teachings.

What is claimed is:

1. A method for providing data services over a wireless communications network, said wireless communications network comprising a plurality of packet data servicing nodes (PDSN's), a plurality of packet control functions (PCFs), and a PCF-PDSN routing controller (PPRC), said method comprising:

receiving a data session request from a mobile node;

initiating a point-to-point connection between a PCF receiving said data session request and a PPRC;

selecting, by said PPRC, one of said plurality of PDSNs;

initiating a point-to-point connection between said PPRC and said selected PDSN;

splicing a point-to-point connection between said receiving PCF and said selected PDSN; and commencing a point-to-point data session between said mobile node and said PDSN, wherein IP packets are routed over a public IP network.

2. The method of claim 1, wherein initiating said point-to-point connection between said PCF and said PPRC comprises:

initiating an A11 signaling interface connection therebetween; and initiating an A10 bearer interface connection therebetween.

3. The method of claim 2, wherein initiating said A11 signaling interface connection comprises:

sending a registration request to said PPRC; and sending a registration reply to said PCF.

4. The method of claim 2, wherein initiating said A10 bearer interface connection comprises:

establishing link control protocol configuration therebetween; and identifying and authenticating a user identity associated with said data session.

5. The method of claim 4, wherein authenticating said user identity comprises an authentication technique selected from the group comprising CHAP and PAP.

6. The method of claim 1, wherein selecting one of said plurality of PDSNs comprises identifying a PDSN from the plurality of PDSNs having particular service capabilities.

7. The method of claim 1, wherein selecting one of said plurality of PDSNs comprises identifying a PDSN from the plurality of PDSNs having available bandwidth.

8. The method of claim 1, wherein commencing a point-to-point data session further comprises:

selectively decompressing compressed IP packets sent by said PCF receiving said data session request to the selected PDSN; and selectively compressing IP packets sent by said selected PDSN to said PCF receiving said data session request.

9. A packet control function (PCF)-to-packet data serving node (PDSN) routing control (PPRC) operating in a controller having a processor and memory, for dynamically controlling distribution of packetized information from a wireless communications network over a public IP network, comprising:

a control channel monitor, for initiating and terminating point-to-point protocol (PPP) control messages for a session;

a PPRC manager, for maintaining configuration information, said PPRC manager interfacing with said control channel monitor, said PPRC manager selects one of a plurality of PDSNs;

a P-interface processor, for implementing a P-interface of A11 signaling, said P-interface processor interfacing with said PPRC manager;

an R-interface processor, for implementing an R-interface of A11 signaling, said R-interface processor interfacing with said PPRC manager;

a data tunnel splicer, for splicing data sessions between a PCF-PDSN pair for a PPP session; and an authentication, authorization, and accounting (AAA) client, interfacing with an AAA database of a service provider, said PPRC manager, and said control channel monitor, for authorizing said PPP session.

10. The PPRC of claim 9, further comprising a PPRC-to-PPRC communicator interfacing with said PPRC manager, P-interface processor, and R-interface processor, said PPRC-to-PPRC communicator exchanging control messages to other PPRC's using said P-interface and R-interface processors.

11. The PPRC of claim 9, wherein said PPRC resides in a switch, and said PPRC switch is adapted to receive packetized information from a plurality of packet control function (PCF) elements, and route said packetized information from one of said plurality of PCFs to said one of said selected plurality of packet data serving nodes (PDSN).

12. The PPRC of claim 9, further comprising a compression/decompression manager for decompressing compressed IP packets sent by a PCF, and compressing IP packets sent by a PDSN.

13. An apparatus for providing data services over a public IP network, comprising:

at least one radio network controller (RNC) for providing radio access to at least one mobile station;

at least one packet control functions (PCF) respectively interfacing with said at least one RNC;

a plurality of packet data servicing nodes (PDSN) for routing packetized information over said public IP network;

at least one PCF-PDSN routing controller (PPRC) for dynamically routing said packetized information between one of said at least one of PCFs and one of said plurality of PDSNs; and a first R-P Interface formed between said one of said at least one PCF and said PPRC, and a second R-P Interface formed between said PPRC and said one of said plurality of PDSNs;

wherein said first and second R-P Interfaces comprise a signaling connection for signaling between said one of said at least one PCF and said one of said plurality of PDSNs for packet data services, and a path for user traffic between said one of said at least one PCF and said one of said plurality of PDSNs for said packet data services.

14. The apparatus of claim 13, wherein said PPRC acts as a PDSN with respect to the at least one PCF.

15. The apparatus of claim 13, wherein said PPRC acts as a PCF with respect to the plurality of PDSNs.

16. The apparatus of claim 13, wherein said signaling connection is provided by user datagram protocol (UDP); and said path for user traffic is provided by a generic routing encapsulation (GRE) tunnel.

17. The apparatus of claim 13, wherein said PPRC further comprises:
a table of PDSN IP addresses; and
a table of PCF IP addresses.

18. The apparatus of claim 13, wherein each said PCF comprises an IP address of said PPRC, where said IP address of said PPRC acts as a surrogate for a PDSN address.

19. The apparatus of claim 13, wherein said PPRC is a switch disposed between said at least one PCFs and said plurality of PDSNs.

20. The apparatus of claim 13, wherein said PPRC is a controller board, where each PCF is coupled to an individual PPRC controller board.

21. The apparatus of claim 13, wherein said PPRC further comprises a compression/decompression manager for selectively decompressing compressed IP packets sent by a PCF to a PDSN, and selectively compressing IP packets sent by a PDSN to a PCF.

22. An apparatus for providing data services over a public IP network, comprising:
at least one radio network controller (RNC) for providing radio access to at least one mobile station;
at least one support general packet radio service (GPRS) support node (SGSN) respectively interfacing with said at least one RNC;
a plurality of gateway GPRS support nodes (GGSNs) for routing packetized information over said public IP network; and
at least one SGSN-GGSN routing controller (SGRC) for dynamically selecting one of said plurality of GGSNs and routing said packetized information between one of said at least one SGSNs and said selected one of said plurality of GGSNs.

23. A method for providing data services over a wireless communications network, said wireless communications network comprising a plurality of gateway GPRS support nodes (GGSNs), a plurality of support general packet radio service (GPRS) support node (SGSN), and a SGSN-GGSN routing controller (SGRC), said method comprising;
receiving a data session request from a mobile node;
initiating a point-to-point connection between a SGSN receiving said data session request and a SGRC;
selecting, by said SGRC, one of said plurality of GGSNs;
initiating a point-to-point connection between said SGRC and said selected GGSN;
splicing a point-to-point connection between said receiving SGSN and said selected GGSN; and
commencing a packet data protocol data session between said mobile node and said GGSN, wherein IP packets are routed over a public IP network.

* * * * *